United States Patent
Irimie et al.

(10) Patent No.: US 11,625,689 B2
(45) Date of Patent: Apr. 11, 2023

(54) SYSTEMS AND METHODS FOR HUMAN RESOURCES APPLICATIONS OF SECURITY AWARENESS TESTING

(71) Applicant: KnowBe4, Inc., Clearwater, FL (US)

(72) Inventors: Alin Irimie, Clearwater, FL (US); Drew Graef, Clearwater, FL (US); Nicole McBride, Oldsmar, FL (US); Isida Drake, Dunedin, FL (US); Daniel Lorch, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/215,935

(22) Filed: Mar. 29, 2021

(65) Prior Publication Data
US 2021/0312400 A1    Oct. 7, 2021

Related U.S. Application Data

(60) Provisional application No. 63/004,217, filed on Apr. 2, 2020.

(51) Int. Cl.
*H04L 9/40* (2022.01)
*G06Q 10/1053* (2023.01)
*G06Q 10/0635* (2023.01)

(52) U.S. Cl.
CPC ..... *G06Q 10/1053* (2013.01); *G06Q 10/0635* (2013.01); *H04L 63/1416* (2013.01); *H04L 63/1433* (2013.01)

(58) Field of Classification Search
CPC ............ G06Q 10/0635; G06Q 10/1053; H04L 63/1433
USPC ........................................................ 705/321
See application file for complete search history.

(56) References Cited

U.S. PATENT DOCUMENTS

| 7,346,541 | B1 * | 3/2008  | Cuttier ............. G06Q 10/06398 705/7.14 |
| 8,615,807 | B1   | 12/2013 | Higbee et al. |
| 8,635,703 | B1   | 1/2014  | Belani et al. |
| 8,719,940 | B1   | 5/2014  | Higbee et al. |
| 8,910,287 | B1   | 12/2014 | Belani et al. |
| 8,966,637 | B2   | 2/2015  | Belani et al. |
| 9,053,326 | B2   | 6/2015  | Higbee et al. |
| 9,166,999 | B1 * | 10/2015 | Kulkarni ................. G06F 21/31 |
| 9,246,936 | B1   | 1/2016  | Belani et al. |

(Continued)

FOREIGN PATENT DOCUMENTS

EP        3 582 468 A1      12/2019
WO    WO-2016/164844 A1    10/2016

OTHER PUBLICATIONS

NPL Search Terms (Year: 2021).*
NPL Search Terms (Year: 2023).*

*Primary Examiner* — Syed A Zaidi
(74) *Attorney, Agent, or Firm* — Foley & Lardner LLP

(57) ABSTRACT

Systems and methods are described for facilitating assessment of security awareness of a candidate prior to a decision on whether or not to hire the candidate. Security awareness of the candidate in association with an application for a job may be assessed using responses to one or more simulated phishing communications provided by the candidate. Responses to the one or more simulated phishing communications may be used to determine a risk score for the candidate. Further, the risk score for the candidate may be used to make a decision on whether or not to hire the candidate.

16 Claims, 9 Drawing Sheets

(56) References Cited

U.S. PATENT DOCUMENTS

| | | |
|---|---|---|
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,876,753 B1 | 1/2018 | Hawthorn |
| 9,912,687 B1 | 3/2018 | Wescoe et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2008/0086759 A1* | 4/2008 | Colson ............... G06F 21/40 713/182 |
| 2011/0047608 A1* | 2/2011 | Levenberg ......... H04L 63/0807 726/7 |
| 2012/0023030 A1* | 1/2012 | Jeffries ............. G06Q 10/1053 705/319 |
| 2013/0211872 A1* | 8/2013 | Cherry ................ G06Q 10/04 705/7.28 |
| 2014/0230061 A1* | 8/2014 | Higbee ................ H04L 67/306 726/24 |
| 2015/0242632 A1* | 8/2015 | Lay .................... G06Q 10/0635 726/25 |
| 2015/0264084 A1* | 9/2015 | Kashyap ............ H04L 63/1483 726/22 |
| 2016/0019668 A1* | 1/2016 | Kilinski ................ G06N 5/048 705/325 |
| 2016/0164898 A1 | 6/2016 | Belani et al. |
| 2016/0301705 A1 | 10/2016 | Higbee et al. |
| 2017/0293873 A1* | 10/2017 | Chrapko .............. G06Q 40/025 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2020/0311260 A1 | 10/2020 | Klonowski et al. |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

* cited by examiner

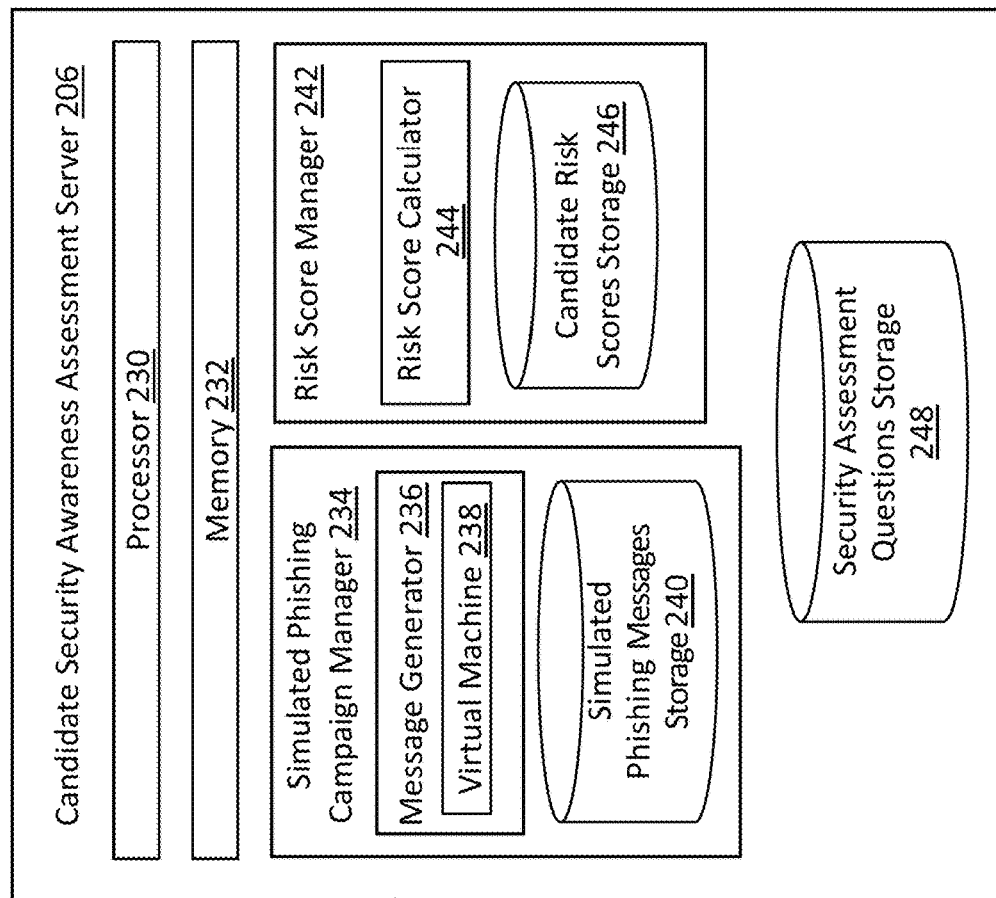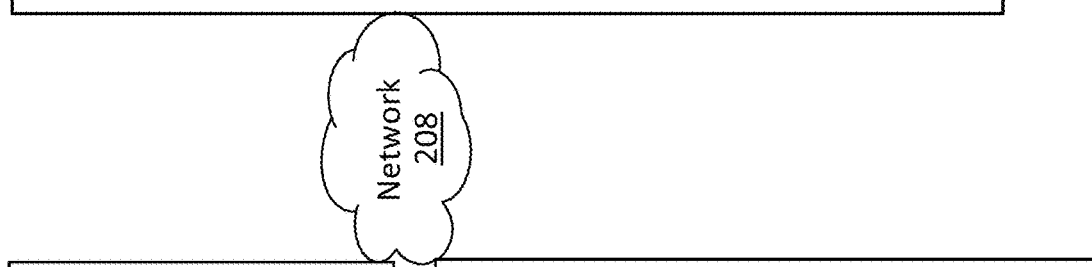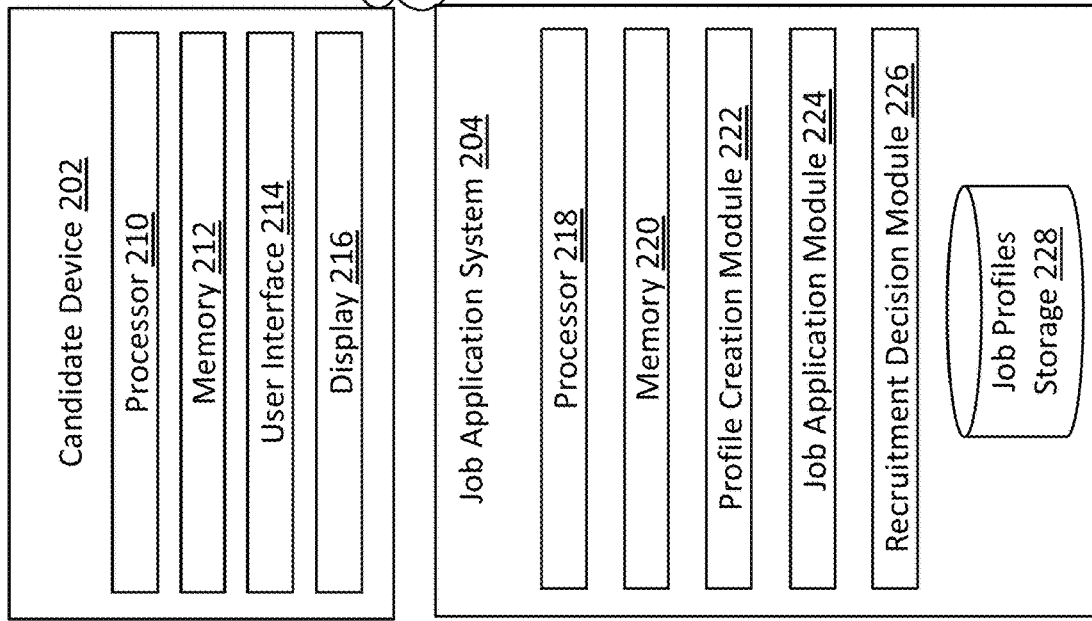
FIG. 2

SYSTEMS AND METHODS FOR HUMAN RESOURCES APPLICATIONS OF SECURITY AWARENESS TESTING

TECHNICAL FIELD

The present disclosure generally relates to systems and methods for facilitating the assessment of the security awareness of a candidate prior to a decision on whether or not to hire the candidate. The systems and methods further relate to actions performed by a candidate security assessment platform to determine a candidate risk score.

BACKGROUND

Organizations have recognized cyber attacks as one of the most prominent threats that may cause a serious breach of data including confidential information. The organizations recognize that their employees are the last line of defense in protecting corporate information, data, intellectual property, and other assets, when technology means fail or have been overcome by cyber attacks. To prevent or to reduce the success rate of cyber attacks on employees, an organization may conduct security awareness training for its employees, along with other security measures. The organization may also conduct surveys or provide tests to employees periodically or non-periodically to assess the security awareness of the employees. Based on awareness levels of the employees, the organization may conduct specific or refresher trainings for a target group of employees to further improve their security awareness. These trainings are mostly conducted for individuals who join the organization as employees. In some example instances, individuals who have joined as employees may not have enough security awareness, and therefore may pose a risk to the organization. In a worst possible scenario, a security breach may occur, and the sensitive information of the organization may be compromised by such employees, even before the organization is able to identify such employees.

Currently, the organizations do not have mechanisms to assess security awareness of candidates applying for jobs at the organizations. The organizations may perform background checks to obtain information about the candidate, for example, to verify whether the candidate has been truthful in disclosure, such as sharing qualifications and achievements to identify any criminal record or credit record issues with the candidate, and to determine any issues from past jobs of the candidate. Further, the organizations may try to obtain the information about the candidate from disparate sources, such as through questionnaires completed by the candidate, phone or in-person interviews, and detailed background checks on the candidate. However, the information obtained may not be sufficient in accurately assessing the security awareness of the candidate, as some of the information obtained from the disparate sources may be biased or misleading. For example, the organizations may rely on a dark web scan to obtain information about a candidate. The dark web scan may indicate that the candidate's personal information has been compromised. However, such indication may not necessarily be due to a lack of security awareness of the candidate and could be as a result of a public data breach. In another example, the background check performed on the candidate may be sparse, incomplete and may not carry complete information about the candidate's security awareness. Also, responses given by the candidate during an interview may be unreliable and security awareness of the candidate may not be assessed correctly. As a result, there is no known methodology that may support an organization in assessment of security awareness of candidates prior to recruitment. Consequently, the organization may be at a security risk possibly leading to breach of the sensitive information of the organization.

SUMMARY

Systems and methods are described for facilitating assessment of security awareness of a candidate prior to a decision on whether or not to hire the candidate. Security awareness of the candidate in association with an application for a job may be assessed using responses to one or more simulated phishing communications provided by the candidate.

Systems and methods are provided for using one or more simulated phishing communications to provide a risk score for a candidate in association with an application for a job. In an example embodiment, a method of using one or more simulated phishing communications to provide a risk score for a candidate in association with an application for a job is described which includes, receiving, by a server, information about a candidate from a job application system; communicating, by the server responsive to receiving the information, one or more simulated phishing communications generated based at least on the information about the candidate; determining, by the server, a risk score for the candidate based at least on results of the one or more simulated phishing communications; and providing, by the server, the risk score to the job application system for use by the job application system to provide information on whether or not the candidate is to be hired.

In some implementations, the method further includes receiving the information about the candidate during one of a profile creation process or a job application process of the job application system.

In some implementations, the method further includes generating, by the server, the one or more simulated phishing communications by personalizing content of the one or more simulated phishing communications based at least on the information about the candidate that identifies one or more social media platforms of the candidate.

In some implementations, the method further includes receiving, by the server, information on authentication information used by the candidate during creation of a profile via the job application system.

In some implementations, the method further includes determining, by the server, the risk score based on the authentication information.

In some implementations, the authentication information includes at least one of strength of password or selection of one-factor or two-factor authentication.

In some implementations, the method further includes identifying, by the server for use in determining the risk score, whether or not any of the authentication information has been associated with a data breach.

In some implementations, the method further includes receiving, by the server, one or more responses of the candidate to one or more security related questions presented by the job application system to the candidate.

In some implementations, the method further includes comprising determining, by the server, the risk score of the candidate based on the one or more responses.

In some implementations, the method further includes determining, by the server, the risk score as a weighted function of two or more of the following information received via the job application system: password strength, password reuse, security question selection, phish prone percentage, email exposure and whether or not two-factor authentication is used.

In another example embodiment, a system of using one or more simulated phishing communications to provide a risk score for a candidate in association with an application for a job is described. The system includes a server comprising one or more processors, coupled to memory and configured to: receive information about a candidate from a job application system; communicate, responsive to receiving the information, one or more simulated phishing communications generated based at least on the information about the candidate; determine a risk score for the candidate based at least on results of the one or more simulated phishing communications; and provide the risk score to the job application system for use by the job application system to provide information on whether or not the candidate is to be hired.

In some implementations, the server is further configured to receive the information about the candidate during one of a profile creation process or a job application process of the job application system.

In some implementations, the server is further configured to generate the one or more simulated phishing communications by personalizing content of the one or more simulated phishing communications based at least on the information about the candidate that identifies one or more social media platforms of the candidate.

In some implementations, the server is further configured to receive information on authentication information used by the candidate during creation of a profile via the job application system.

In some implementations, the server is further configured to determine the risk score based on the authentication information.

In some implementations, the authentication information includes at least one of strength of password or selection of one-factor or two-factor authentication.

In some implementations, the server is further configured to identify for use in determining the risk score, whether or not any of the authentication information has been associated with a data breach.

In some implementations, the server is further configured to receive one or more responses of the candidate to one or more security related questions presented by the job application system to the candidate.

In some implementations, the server is further configured to determine the risk score of the candidate based on the one or more responses.

In some implementations, the server is further configured to determine the risk score as a weighted function of two or more of the following information received via the job application system: password strength, password reuse, security question selection, phish prone percentage, email exposure and whether or not two-factor authentication is used.

Other aspects and advantages of the present solution will become apparent from the following detailed description, taken in conjunction with the accompanying drawings, which illustrate by way of example the principles of the present solution.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2 depicts an implementation of some of the architecture of an implementation of a system for providing a risk score for a candidate in association with an application for a job, according to some embodiments;

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for facilitating the assessment of the security awareness of a candidate prior to a hiring decision. In particular, Section B describes systems and methods that further relate to actions performed by a candidate security assessment platform to determine a candidate risk score.

A. Computing and Network Environment

Figure 1A:
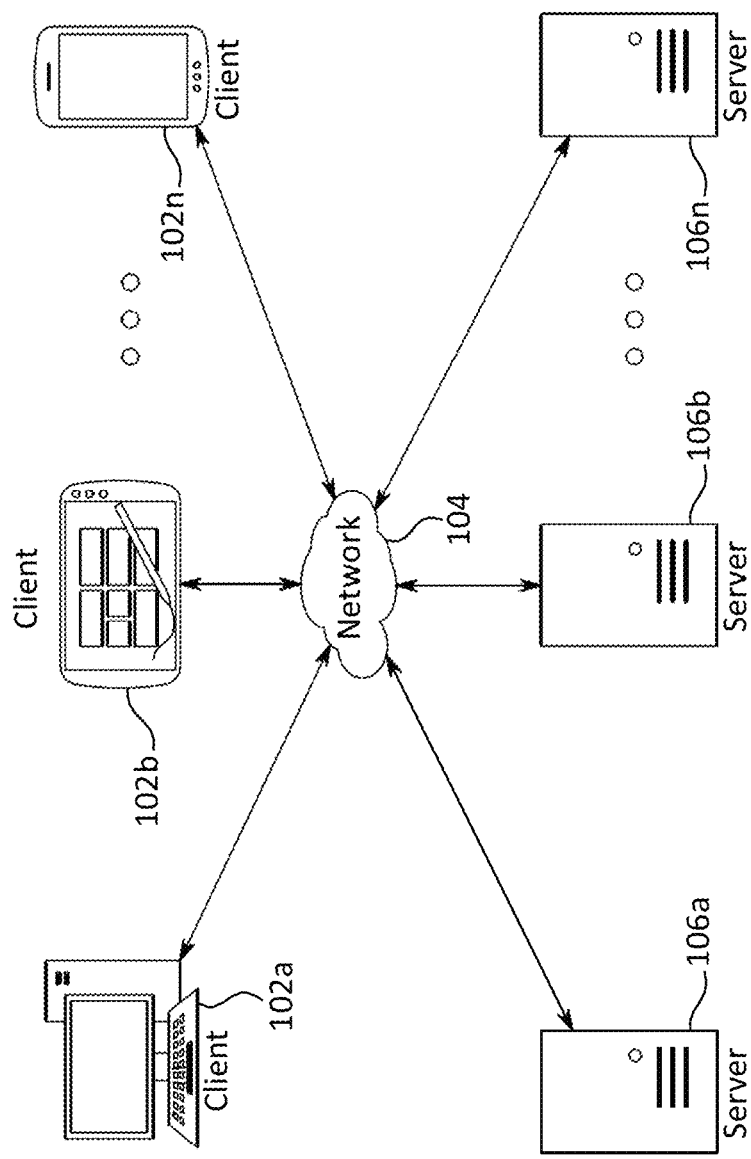
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
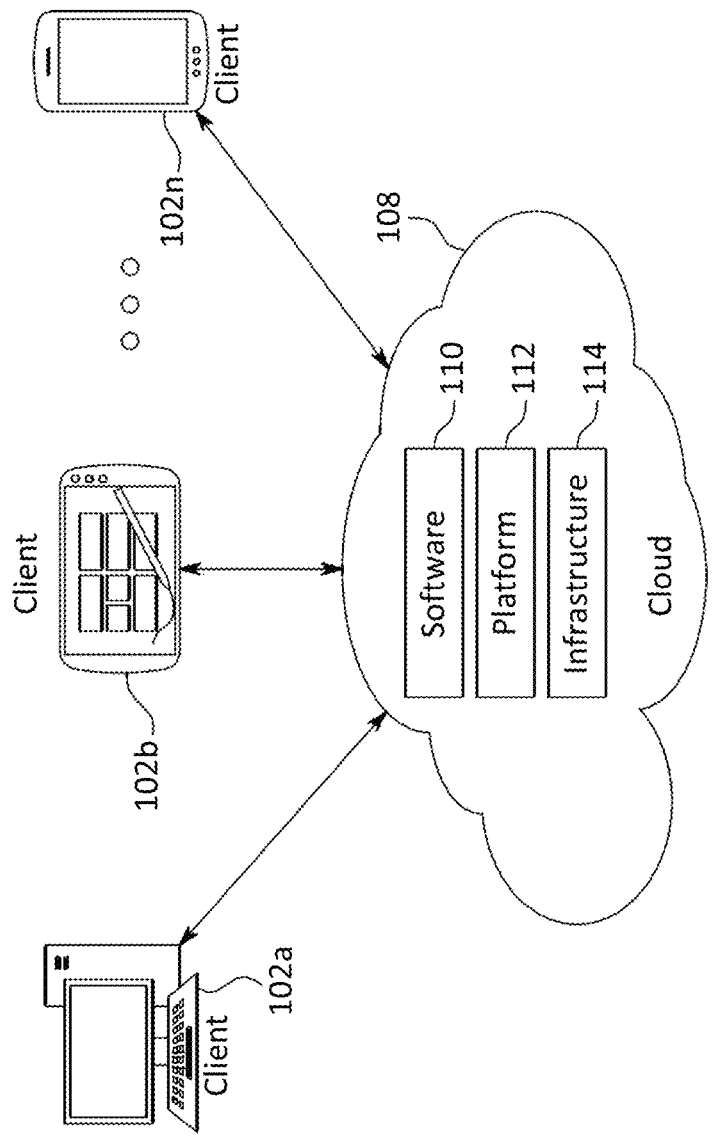
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
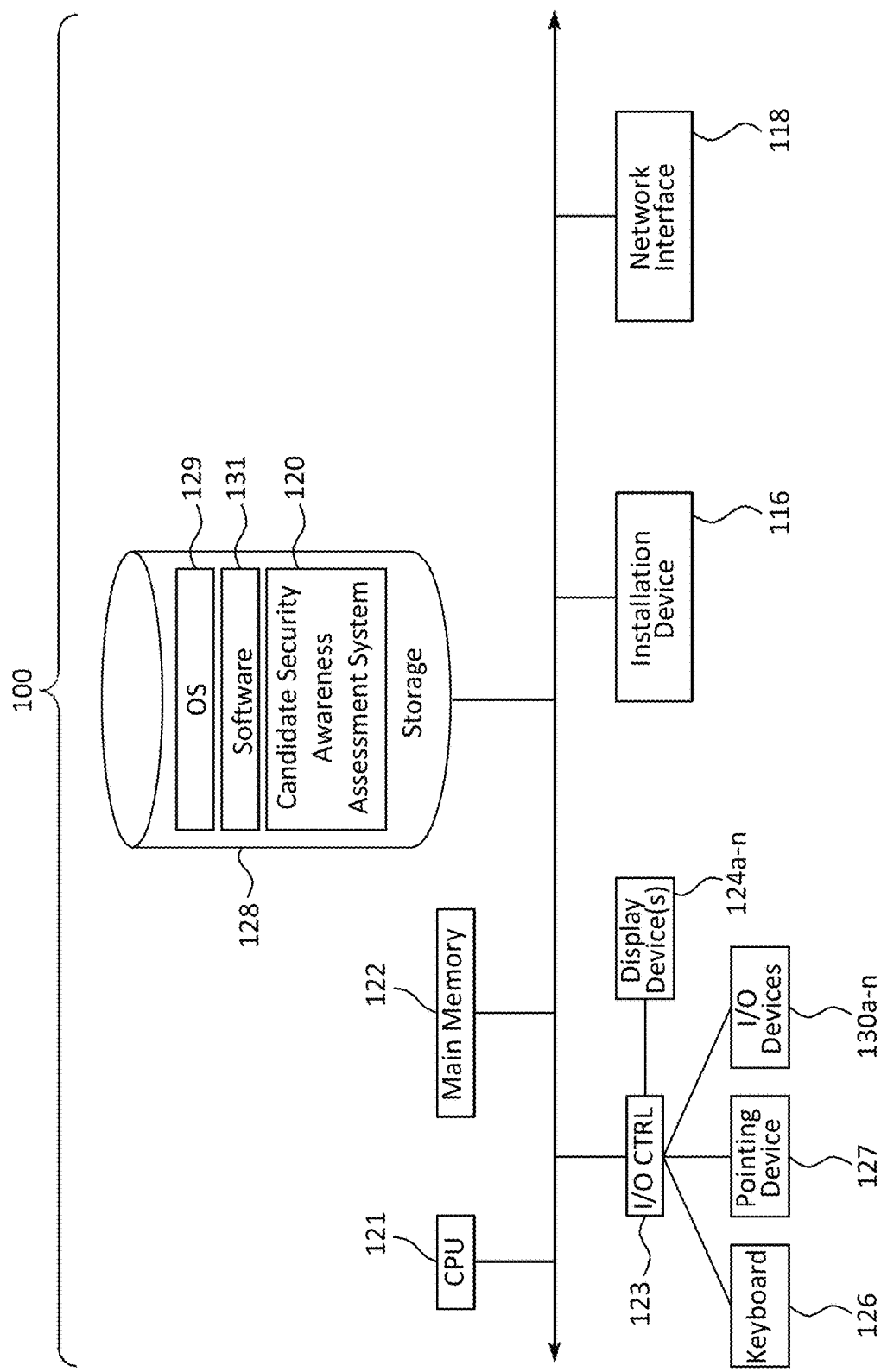
FIGS. 1C and 1D are block diagrams depicting embodiments of computing devices useful in connection with the methods and systems described herein, according to some embodiments.
Figure 1D:
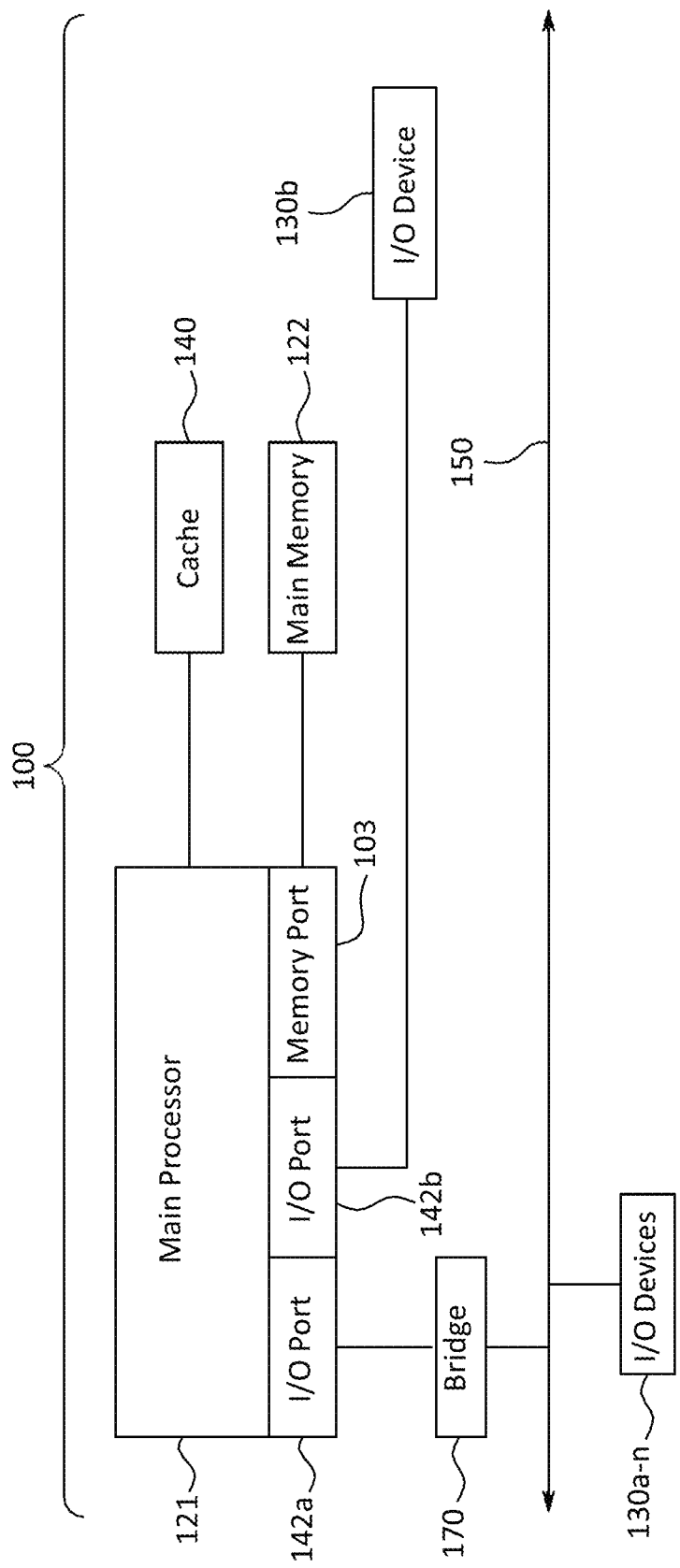

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of a candidate security awareness assessment system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to candidate security awareness assessment system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, N.Y.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Human Resources Applications of Security Awareness Testing of a Candidate Applying for a Job The following describes systems and methods for facilitating the assessment of the security awareness of a candidate prior to a decision on whether or not to hire the candidate. The systems and methods further relate to actions performed by a candidate security assessment platform to determine a candidate risk score.

The systems and the methods of the present disclosure may enable the candidate security awareness assessment platform (interchangeably referred to as a candidate security awareness assessment server) to perform a comprehensive assessment of the security awareness of the candidate prior to the hiring/recruitment decision for a job vacancy at an organization. The organization may interchangeably be referred to as a hiring organization or a hiring company. In some embodiments, the candidate security awareness assessment platform may determine a level of security awareness needed for the job vacancy. For example, an IT supervisor may need to have higher security awareness standards than someone in a non-technical role without access to confidential or sensitive information. Further, the candidate security assessment platform may determine a level of security awareness of the candidate based on information obtained about the candidate. In some embodiments, when making an application for a job vacancy either on an online portal of the hiring organization's hosted job application platform (referred to as a job application system in FIG. 2) or on a website presented by a third-party job application platform, the candidate may follow a profile creation process and a job application process. The profile creation process may include creation of a username and a password by the candidate. The candidate may also be required to provide additional details, such as personal details and professional details during the profile creation process. Further, the job application process may include searching and application for jobs by the candidate.

In some embodiments, the systems and the methods of the present disclosure may provide a simulated phishing campaign manager. The simulated phishing campaign manager may send one or more simulated phishing communications to the candidate at the beginning, during and/or after the profile creation process and/or the job application process, for example, to determine how the candidate would respond to an actual phishing attack. In an example, the simulated phishing communications may be sent to the candidate to evaluate specific security vulnerabilities/weaknesses associated with the candidate. One or more results of the simulated phishing communications sent to the candidate may highlight vulnerabilities that may place the hiring organization at risk if the candidate is hired, or if the candidate is permitted to access organization's networks or online services during phishing attacks. The one or more results of the one or more simulated phishing communications may be understood as one or more responses to the one or more simulated phishing communications sent to the candidate. In some examples, the candidate security assessment platform may use the results of the simulated phishing communications for calculation of the candidate risk score for the candidate. The candidate risk score of the candidate may be a representation of the vulnerability of the candidate to a malicious attack. For example, the candidate risk score may be used to determine specific strengths and vulnerabilities of the candidate. In an example, the candidate risk score may be determined as a weighted function of two or more of the following information received via the job application platform: password strength, password reuse, security question selection, phish prone percentage, email exposure and whether or not two-factor authentication is used.

According to some embodiments, the candidate security assessment platform may provide the candidate risk score of the candidate and other information to a recruitment decision platform (referred to as a recruitment decision module 226 in FIG. 2). The recruitment decision platform may be configured to provide a recommendation to the hiring organization as to whether or not to hire the candidate. In an example, the recruitment decision platform may use the candidate risk score in conjunction with information obtained from other sources (for example scores from candidate's interviews, Intelligence Quotient (IQ) tests, psychometric testing, etc.) to make the recommendation as to whether the candidate should be hired. Further, the recruitment decision platform may also be configured to provide recommendations to the hiring organization as to which security awareness training needs to be provided to the candidate if the candidate is hired and also the relative urgency and priority of the security awareness training.

Referring to FIG. 2 in a general overview, FIG. 2 depicts an implementation of some of the architecture of an implementation of system 200 for providing a risk score for a candidate in association with an application for a job, according to some embodiments. In an example, the candidate may be any individual who is seeking employment, and likewise seeking to fill out a job vacancy in an organization (interchangably referred to as a hiring organization). Further, the risk score of the candidate may be a representation of vulnerability of the candidate to a malicious attack. The risk score of the candidate may interchangeably be referred to as a candidate risk score.

System 200 may include candidate device 202, job application system 204, candidate security assessment server 206, and network 208 enabling communication between the system components. Candidate security awareness assessment server 206 may interchangably be referred to as candidate security assessment platform 206 or server 206. Candidate device 202 may exchange information over network 208 with job application system 204 and candidate security assessment server 206. Network 208 may be an example or instance of network 104, details of which are provided with reference to FIG. 1A and its accompanying description. Candidate device 202 may include processor 210, memory 212, user interface 214, and display 216. In some embodiments, job application system 204 may include processor 218, memory 220, profile creation module 222, job application module 224, recruitment decision module 226, and job profiles storage 228. Further, in some embodiments, candidate security awareness assessment server 206 may include processor 230 and memory 232. Candidate security awareness assessment server 206 may further include simulated phishing campaign manager 234. Simulated phishing campaign manager 234 may include message generator 236 comprising a virtual machine 238 and simulated phishing messages storage 240. Candidate security awareness assessment server 206 may also include risk score manager 242 comprising risk score calculator 244 and candidate risk scores storage 246. Further, candidate security awareness assessment server 206 may comprise security assessment questions storage 248. Security assessment questions storage 248 may include one or more security assessment questionnaires that may be different for different departments and/or different positions. In an example, a security assessment questionnaire may include a plurality of possible security related questions that may be asked to the candidate during an application for a job at the hiring organization. Further, the security related questions may have a classification that may indicate for what role, for what level of role, for what type of role, etc. the security related question is appropriate for. Although, job application system 204 and candidate security awareness assessment server 206 are shown as separate entities, job application system 204 and candidate security awareness assessment server 206 may be implemented as a single entity, and managed by a third-party entity or an organization. In some embodiments, job application system 204 may be managed by a third party and candidate security awareness assessment server 206 may be managed by an organization or vice-versa.

Referring now to FIG. 2 in more detail, in some embodiments, candidate device 202 may be capable of exchanging information with job application system 204 via network 208. In some embodiments, candidate device 202 may be any device used by a candidate. For example, candidate device 202 may be any computing device, such as a desktop computer, a laptop, a mobile device, a Person Digital Assistant (PDA) or any other computing device. As described above, the candidate may be any individual who is seeking employment, and likewise seeking to fill a job vacancy at the hiring organization. The candidate may also be referred to as a job candidate, a job seeker, or a prospective employee. In an implementation, candidate device 202 may be a device, such as client device 102 shown in FIGS. 1A and 1B. Candidate device 202 may be implemented by a device, such as computing device 100 shown in FIGS. 1C and 1D. For example, processor 210 and memory 212 of candidate device 202 may be CPU 121 and main memory 122 respectively as shown in FIGS. 1C and 1D. Candidate device 202 may further include a user interface 214 such as a keyboard, a mouse, a touch screen, or any other appropriate user interface. One should appreciate that components of candidate device 202 may correspond to similar components of computing device 100 in FIGS. 1C and 1D, such as keyboard 126, pointing device 127, I/O devices 130a-n and display devices 124a-n. Additionally, user interface 214 may enable candidate device 202 to communicate with other devices and systems, such as job application system 204. Candidate device 202 may also include display 216, such as a screen, a monitor connected to the device in any manner, or any other appropriate display. In an implementation, candidate device 202 may display content for the candidate using display 216 and is able to accept candidate interaction via user interface 214 responsive to the displayed content. In an example, the content may include log-in instructions, security assessment questionnaires, simulated phishing communications, etc.

Referring again to FIG. 2, in some embodiments, job application system 204 may be implemented in a variety of computing systems, such as a mainframe computer, a server, a network server, a laptop computer, a desktop computer, a notebook, a workstation, and the like. In an implementation, job application system 204 may be communicatively coupled with candidate device 202 and candidate security awareness assessment server 206 through network 208 for exchanging information. In an implementation, job application system 204 may be implemented in a server, such as server 106 shown in FIG. 1A. In another implementation, job application system 204 may be implemented by a device, such as computing device 100 shown in FIGS. 1C and 1D. For example, processor 218 and memory 220 of job application system 204 may be CPU 121 and main memory 122 respectively as shown in FIGS. 1C and 1D. In an embodiment, job application system 204 may be the hiring organization's hosted job application platform. In an example, the hiring organization may offer an online portal through the job application system 204 that may enable aspiring candidates to register and apply for jobs. The online portal may be hosted by the hiring organization for recruiting candidates. In some embodiments, job application system 204 may be a third-party job application platform. For example, available job vacancies of a hiring organization may be hosted on a third-party job application platform and presented to candidates as a website specifically designed for matching candidates with jobs. An example of such websites includes Indeed.com "indeed.com" by Indeed®) which is an employment-related search engine for job listings. The Indeed platform may aggregate job listings from various websites including job boards, staffing forms, associations, and company career pages, allowing candidates to apply directly to jobs on Indeed's site. Another example of such web sites includes Monster.com® ("monster.com/jobs"), which is an employment website that is designed to allow hiring organizations (employers) to post job requirements for a position to be filled, and similarly allows a candidate to locate and fill out a job vacancy or submit resumes online.

Further, profile creation module 222, job application module 224, and recruitment decision module 226 of job application system 204 may be coupled to processor 218 and memory 220. In some embodiments, profile creation module 222, job application module 224, and recruitment decision module 226, amongst other modules, may include routines, programs, objects, components, data structures, etc., which may perform particular tasks or implement particular abstract data types. Profile creation module 222, job application module 224, and recruitment decision module 226 may also be implemented as, signal processor(s), state machine(s), logic circuitries, and/or any other device or component that manipulate signals based on operational instructions.

In some embodiments, profile creation module 222, job application module 224, and recruitment decision module 226 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or, the processing unit may be dedicated to perform the required functions. In some embodiments, profile creation module 222, job application module 224, and recruitment decision module 226 may be machine-readable instructions which, when executed by a processor/processing unit, perform any of the desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 220.

In some embodiments, job profiles storage 228 may store job profiles of candidates applying for jobs. In an example, a job profile of a candidate may include information related to name of the candidate, previous employers, candidate's tenure in a specific industry, educational qualifications and/or achievements, professional certifications, demographical details such as age, gender, nationality, etc, and other information from the resume of the candidate, and the third-party job application platform used by the candidate to apply for the job vacancy, for example, Monster™, LinkedIn™, Glassdoor™, etc. In some embodiments, job profiles storage 228 may be accessed by candidate security awareness assessment server 206 whenever an assessment of security awareness of candidates is to be performed by candidate security assessment server 206.

Referring back to FIG. 2, in some embodiments, candidate security awareness assessment server 206 may be any server capable of exchanging information/data over network 208. In an implementation, candidate security awareness assessment server 206 may be a server, such as server 106 shown in FIG. 1A. Candidate security awareness assessment server 206 may be implemented by a device, such as computing device 100 shown in FIGS. 1C and 1D. For example, processor 230 and memory 232 of candidate security awareness assessment server 206 may be CPU 121 and main memory 122 respectively as shown in FIGS. 1C and 1D. In some embodiments, candidate security awareness assessment server 206 may be implemented as a part of a cluster of servers. In some embodiments, candidate security awareness assessment server 206 may be implemented across a plurality of servers, thereby, tasks performed by candidate security awareness assessment server 206 may be performed by the plurality of servers. These tasks may be allocated among the cluster of servers by an application, a service, a daemon, a routine, or other executable logic for task allocation. Known examples of candidate security awareness assessment server 206 include Microsoft® Exchange Server, and HCL Domino. In an example, candidate security awareness assessment server 206 may be owned or managed or otherwise associated with the hiring organization. In another example, candidate security awareness assessment server 206 may be owned or managed or otherwise associated with a platform provided by a third-party service provider. In one embodiment, candidate security awareness assessment server 206 may be a part of a cluster of servers. In some embodiments, tasks performed by candidate security awareness assessment server 206 may be performed by a plurality of servers. These tasks may be allocated among the cluster of servers by an application, service, daemon, routine, or other executable logic for task allocation.

In some embodiments, candidate security awareness assessment server 206 may perform testing of security awareness of a candidate in association with an application for a job at a hiring organization. In an example, the application for the job may also be referred to as a Human Resource (HR) application as the application for the job submitted by the candidate may be directed to an HR professional at the hiring organization. Based on the assessment, candidate security awareness assessment server 206 may determine a risk score for the candidate. The risk score of the candidate may be a representation of vulnerability of the candidate to a malicious attack. In one embodiment, candidate security awareness assessment server 206 may compare the risk score with a threshold score to determine whether the candidate can be hired or not. In some embodiments, candidate security awareness assessment server 206 may communicate a recommendation to a hiring manager and/or a HR professional of the hiring organization to enable the hiring manager and/or the HR professional in decision making on recruitment of the candidate.

Referring again to FIG. 2, simulated phishing campaign manager 234 may be an application or a program that manages various aspects of a simulated phishing attack, for example, tailoring and/or executing a simulated phishing attack. A simulated phishing attack may test readiness of a candidate to handle phishing attacks such that malicious actions are prevented. For instance, simulated phishing campaign manager 234 may monitor and control timing of various aspects of a simulated phishing attack, may process requests for access to attack results, or may perform other tasks related to the management of a simulated phishing attack.

In some embodiments, message generator 236 may be an application, service, daemon, routine, or other executable logic for generating messages. The messages generated by message generator 236 may be of any appropriate format. For example, they may be email messages, text messages, messages used by messaging applications such as, e.g., WhatsApp™, or any other type of message. Message type to be used in a particular simulated phishing message may be selected by, for example, simulated phishing campaign manager 234. The messages may be generated in any appropriate manner, e.g. by running an instance of an application that generates the desired message type, such as running e.g. a Gmail® application, Microsoft Outlook™, WhatsApp™, a text messaging application, or any other appropriate application. The messages may be generated by running a messaging application on virtual machine 238 or may be run in any other appropriate environment. The messages may be generated to be in format consistent with specific messaging platforms, for example Outlook 365™, Outlook Web Access (OWA), Webmail™, iOS®, Gmail®, and so on. In an implementation, message generator 236 may be configured to generate simulated phishing messages. The simulated phishing messages may also be referred to as simulated phishing attacks or simulated phishing communications. Further, simulated phishing messages storage 240 may store simulated phishing message templates.

In some embodiments, risk score manager 242 may be an application or a program that manages risk scores of candidates who apply for a job at a hiring organization. A risk score of a candidate may be a representation of vulnerability of the candidate to a malicious attack. Risk score manager 242 may store profile of the candidate and the risk score associated with each candidate in candidate risk scores storage 246. Further, risk score manager 242 may deploy risk score calculator 244 to determine risk scores for the candidates who applied for the job at the hiring organization. In some embodiments, risk score calculator 244 may analyze responses to security related questions provided by the candidate during the profile creation process and/or the job application process.

Further, risk score calculator 244 may analyze responses/results of the simulated phishing emails/communications provided by the candidate to determine the risk score for the candidate. Using the responses to the simulated phishing communications and/or the security related questions provided by the candidate, risk score calculator 244 may analyze instinctive and un-prompted behavior related to the security awareness of the candidate. Furthermore, risk score calculator 244 may update the risk score based on information revealed by the candidate during the profile creation process and/or the job application process and also based on information gathered about the candidate through background checks and/or dark web scans. In some embodiments, risk response score calculator 244 may obtain the responses from the candidate through information stored in job profiles storage 228 or inputs from profile creation module 222, inputs from job application module 224, inputs from interviewer, information from background checks, and the like. Using the above-mentioned information, risk score calculator 244 may update and store candidate risk scores in candidate risk scores storage 246. In some embodiments, candidate risk scores storage 246 may be a database system configured to process requests for access to risk scores of the candidates and/or may perform other tasks related to the management of risk scores of the candidates.

According to an embodiment, job application system 204 may be hosted, co-located, or combined with candidate security assessment server 206. In some embodiments, job application system 204 and candidate security awareness assessment server 206 may be implemented together as a single unit. Further, in some embodiments, simulated phishing campaign manager 234 may operate as a plug-in in job application system 204 and obtain data from job application system 204.

In operation, whenever a candidate aspires to apply for a position due to a job vacancy in an organization, the candidate may register himself or herself on job application system 204. In an example, candidate device 202 may access job application system 204 through one or more software applications on candidate device 202 to securely exchange data with job application system 204 over network 208. In an embodiment, the one or more software applications may be native applications, such as a browser executing on candidate device 202. The candidate may access online job portal hosted by the hiring organization/third-party through the browser. In some embodiments, the one or more software applications may be customized applications that can be installed on candidate device 202 and that enables the candidate to apply for jobs without having to use a browser to access the job portal. Example implementations of the manner in which the candidate may register himself or herself on job application system 204 to begin the application for a job at the hiring organization is explained hereinafter.

Profile Creation Process

In an example instance, when the candidate accesses the job portal, job application system 204 may provide an option to login to job application system 204 or option to register with job application system 204. In instance where the candidate is not registered, the candidate may be enabled to choose the option to register with job application system 204. In response to selection of the option to register, profile creation module 222 may initiate a profile creation process by prompting the candidate to set a username and a password. For example, the profile creation module 222 may prompt the candidate to enter a username which may be a personal email address and create a password. In some embodiments, instructions may be displayed on candidate device 202 of certain requirements for the creation of the password, which may be a basic level security requirement. For example, instructions may be provided that an eight-character password string is a minimum requirement for creation of password.

Subsequent to creation of the username and the password by the candidate, in one embodiment, profile creation module 222 may determine if the candidate is legitimate through checking validity of the email address provided by the candidate and having him or her accept a terms of agreement that focuses on the correctness of the data. Once the candidate accepts the terms of agreement document, profile creation module 222 may send a confirmation email/message to the email address/mobile number of the candidate. The candidate may be enabled to validate the email address and complete the registration process using information provided in the confirmation email. In an example, the information provided in the confirmation email may be a link to a website or online portal where the candidate may continue the profile creation process. Other implementations to confirm the email address/mobile numbers are contemplated herein. The candidate may be able to log back into job application system 204 post the validation of the email address/mobile number. In case the email address/mobile number is found to be invalid, profile creation module 222 may display an error message to the candidate stating that the registration has failed and that the email address provided by the candidate is not valid/correct. In some embodiments, the profile creation module 222 may complete the registration process upon receiving the username and the password, and the candidate may be able to login without having to validate the email address. As a result of completion of the registration process, a profile account of the candidate may be created by profile creation module 222.

Upon logging into job application system 204, according to some embodiments, profile creation module 222 may prompt the candidate for a password reset to update the initially set password as a best practice. In response to receiving a new password from the candidate, profile creation module 222 may update the login credentials of the candidate. The changed password may hereinafter be referred to as a second password. Further, the candidate is enabled to login to the profile account in job application system 204 using the second password. When the candidate logs in to the profile account, profile creation module 222 may provide an option to the candidate for a two-factor authentication for logging-in to the profile account at job application system 204. The candidate may choose to select the two-factor authentication or continue to use one-factor authentication for logging into job application system 204. In some embodiments, profile creation module 222 may communicate the selection of the two-factor authentication by the candidate to candidate security assessment server 206. In response to the selection of two-factor authentication, profile creation module 222 may provide one or more options to the candidate to select a secondary authentication feature such as Short Message Service (SMS) based authentication, time-dependent One Time Password (OTP) based authentication or a security question-based authentication, in addition to the password authentication. In response to selection of the security question-based authentication, profile creation module 222 may present a list of security questions to the candidate. In continuation with the profile creation, profile creation module 222 may present an option for the candidate to select one or more security questions to enable the candidate to login in case the candidate forgets the password. Responses to the one or more security questions provided by the candidate may be received by profile creation module 222 and stored securely at job profiles storage 228.

In some embodiments, job application system 204 may indicate that the feature development is in progress in response to selection of the two-factor authentication, if the purpose of providing two-factor authentication is for examination/testing purposes on whether the candidate selects the two-factor authentication option. Profile creation module 222 may also prompt the candidate to enter a second email address or a phone number to use with the two-factor authentication. In an embodiment, profile creation module 222 may communicate the second email address or the phone number of the candidate to candidate security assessment server 206.

Continuing with the profile creation, profile creation module 222 may provide various fields on the portal for the candidate to provide information for profile creation which may include personal information, qualifications, and previous work experience. In an example, the personal information may include name of the candidate, address of the candidate, nationality of the candidate, age of the candidate, marital status of the candidate, hobbies of the candidate, and the like. Further, in an example, qualifications may include educational details, such as course, course type, specialization, university, year of completion, Grade Point Average (GPA), and the like. In an example, previous work experience may include professional details, such as name of previous employers, candidate's tenure in a specific industry, designation, work profile, professional achievements, and the like. Subsequent to receiving the information for the profile creation, profile creation module 222 may provide fields for the candidate to input information on job requirements such preferred job location, expected salary, job category, and the like. Using the profile account details and the job requirement information, profile creation module 222 may create a basic job profile for the candidate. Further, profile creation module 222 may store the job profile for the candidate in job profiles storage 228 for future use.

Job Application Process

Referring back to FIG. 2, post the creation of the job profile, job application module 224 may enable the candidate to search and apply for jobs offered by the hiring organization. In one embodiment, job application module 224 may automatically present job openings (interchangeably referred to job vacancies or job postings or job opportunities) offered by the hiring organization(s) based on the job profile. In some embodiments, job application module 224 may present job openings in response to the candidate's search. The job profile of the candidate stored in job profiles storage 228 may get updated in response to change or addition of profile information, and/or application of jobs. As an example, the job profile of the candidate may get updated with information including position/designation of the job vacancy, title of the job vacancy, level of the job vacancy the candidate has applied for, location where the candidate is based and where the job vacancy is located, name and job title of the person that the job vacancy will report to, and the like.

In some embodiments, based on candidate's job profile or in general, job application module 224 may provide a security assessment questionnaire to the candidate. In an example, the security assessment questionnaire may include one or more security related questions relevant for a determination of security awareness of the candidate. The one or more security related questions may be related to internet security, phone security, physical security, etc. In some examples, the security assessment questionnaire may be specific to a department and/or a designation of the job vacancy. In an embodiment, the security assessment questionnaire may include one or more standardized security related questions. In some embodiments, the security assessment questionnaire may be customized for the hiring organization. Job application module 224 may access security assessment questions storage 248 and retrieve the security assessment questionnaire. In an example, job application module 224 may use all the security related questions stored in security assessment questions storage 248 for a given role/position of the job vacancy to assess the candidate. In other examples, the job application module 224 may select security related questions either based on a pre-defined criteria or to perform general security assessment to present the security related questions to the candidate. In an example, job application module 224 may present the security assessment questionnaire to the candidate along with any other assessments such as a personality test (e.g., Myers Briggs) or an IQ test. A sample set of security related questions for a security assessment questionnaire are illustrated below:

---

Question 1: What makes a password a strong password?
Question 2: Sort the following passwords weakest to strongest.
Question 3: How often should you change your password?
Question 4: Is the IT department the only department that needs to worry about IT Security?
Question 5: Which organization departments should concern themselves with IT Security?
Question 6: Should you worry about viruses or malicious attachments since your organization has fantastic anti-virus software?
Question 7: If your organization has best in market anti-virus/anti-malware software, this protects the organization against X% of serious/harmful attacks. [True/False]
Question 8: You see a food delivery personnel struggling to open the door to deliver the food. What should you do?
Question 9: Physical Security is NOT related to information security, nor is it your responsibility. [True/False]
Question 10: There is no harm in leaving your workstation unlocked. [True or False]
Question 11: Select all the tactics a hacker could use to gain access to organization information.
Question 12: Should you always open an email attachment received in an email from your CEO?

---

In some embodiments, a security related question presented to the candidate by job application module 224 may be "What makes a password a strong password?". The candidate may be asked to identify aspects of a strong password. In an embodiment, the candidate may also be asked to provide one or more examples of a strong password. In some embodiments, another security related question that may be asked to the candidate may be, "Sort the following passwords weakest to strongest". Multiple passwords of varying strengths may be presented to the candidate as options. The candidate may shuffle the options to sort the passwords according to their strengths.

In some embodiments, another security related question that may be asked to the candidate is, "How often should you change your password?" In some embodiments, another security related question that may be asked to the candidate is, "Which organization departments should concern themselves with IT Security?". The candidate may be provided with a list including plurality of typical organization departments and the candidate may select one or more organization departments as a response. In some embodiments, another security related question that may be asked to the candidate is, "Should you worry about viruses or malicious attachments since your organization has fantastic anti-virus software?". Further, in some embodiments, another security related question that may be asked to the candidate is, "Should you always open an email attachment received in an email from your CEO??".

In some embodiments, the candidate may be provided with multiple selectable options (answers). The candidate may select one or more options from the multiple selectable options/answers. In some embodiments, the candidate may be provided with two selectable options—Yes/No. The candidate may select either Yes or No. In some embodiments, the candidate may be provided with two selectable options—True/False. The candidate may select either True or False.

According to an implementation, job application module 224 may update job profiles storage 228 based on responses to security related questions listed in the security assessment questionnaire provided by the candidate. Further, job application module 224 may provide the responses to security related questions to candidate security awareness assessment server 206 for use in assessment of the security awareness of the candidate. In some embodiments, the responses to the security assessment questionnaire may be used as an input for calculation of the risk score for the candidate.

Once the candidate has completed the profile creation process and the job application process, candidate security awareness assessment server 206 may obtain information about the candidate acquired during the profile creation process and/or the job application from job application system 204. In an implementation, job application system 204 may consolidate all the information collected for the multiple candidates and send the consolidated information to candidate security awareness assessment server 206 via a secure communication for analysis to determine trends or other statistical insights amongst the multiple candidates. In an embodiment, job application system 204 may send all the information of the candidate to candidate security assessment server 206. In some embodiments, job application system 204 may send a subset of the information to candidate security assessment server 206. For example, job application system 204 may send information relevant to the specific job vacancy that the candidate is applying to and not the complete information.

In an implementation, candidate security awareness assessment server 206 may be enabled to interface directly with a Human Resource (HR) database or a platform that the hiring organization has, to obtain information about the candidates. Examples of HR platforms include, but are not limited to, Greenhouse™ Recruiting, Automatic Data Processing (ADP®, Workday®, Zenefits™, Rippling™, ClearCompany® HR, and Paycor™. In some examples, the candidate may provide information to a person at the hiring organization. In an example, the person may be an HR professional or a recruiter with whom the candidate had interacted on phone or in person. In another example, the person may be an employee of the hiring organization who had met the candidate at a job fair. In yet another example, the person may be any person associated with the hiring organization who had taken candidate's job interview. In some embodiments, candidate security awareness assessment server 206 may provide an interface to allow for entering of comments about the candidate by the person of the hiring organization who had interacted with the candidate. In some embodiments, candidate security awareness assessment server 206 may then initiate candidate profile risk assessment process for each candidate.

Candidate Profile Risk Assessment Process

In an example implementation, job profiles stored in job profiles storage 228 may be retrieved and analyzed by candidate security awareness assessment server 206 for facilitating the assessment of the security awareness of the candidates prior to a decision on whether or not to hire one or more of the candidates. Further, candidate security awareness assessment server 206 may be configured to receive information about the candidate, such as authentication information used by the candidate during creation of the profile via job application system 204. In an example, the authentication information may include at least one of strength of password or selection of one-factor or two-factor authentication. In an embodiment, based on the job profile and the authentication information, candidate security awareness assessment server 206 may examine one or more factors from information provided about the candidate that provides information on security awareness of the candidate. In one example, in a scenario where there was more than one step in the profile creation process which requires the candidate to create a new or the second password, candidate security awareness assessment server 206 may evaluate if the candidate used the same password or selected/created a different password. Another example may include candidate security awareness assessment server 206 evaluating strength of the password that the candidate has created to login into job application system 204. Candidate security awareness assessment server 206 may evaluate the strength of the password based at least on machine learning algorithms. For instance, candidate security awareness assessment server 206 may evaluate the strength of the password (interchangeably referred to as password strength) based on some of National Institute of Standards and Technology (NIST) standards provided below.

a) A minimum of eight characters and a maximum length of at least 64 characters.

b) The ability to use all special characters but no special requirement to use them.

c) Restrict sequential and repetitive characters (e.g. 12345 or aaaaaa).

d) Restrict context specific passwords (e.g. the name of the site, etc.).

e) Restrict commonly used passwords (e.g. p@ssw0rd, etc.) and dictionary words.

f) Restrict passwords that match those obtained from previous breaches.

Candidate security awareness assessment server 206 may make use of the second email address or the phone number in attempting to reach the candidate during the two-factor authentication. If candidate security awareness assessment server 206 does not contact the candidate for the two-factor authentication, profile creation module 222 may assess how the candidate reacts to not being contacted. In an example, the candidate may report that job application system 204 has not operated correctly, the candidate may ignore not being contacted, and proceed anyway, or the candidate may abort the profile creation process. The candidate behavior in response to usage or non-usage of the second email address or the phone number by job application system 204 for secondary authentication during two-factor authentication is assessed by candidate security assessment server 206. In an embodiment, candidate security awareness assessment server 206 may also perform a series of tests around the candidate's behavior in response to the candidate selecting the two-factor authentication option. For example, candidate security awareness assessment server 206 may seek the second email address or the phone number and may attempt to reach the candidate during the two-factor authentication. If candidate security awareness assessment server 206 does not contact the candidate for the two-factor authentication, candidate security awareness assessment server 206 may assess how the candidate reacts to not being contacted. The candidate behavior in response to usage or non-usage of the second email address or the phone number by job application system 204 for secondary authentication during two-factor authentication is evaluated by candidate security awareness assessment server 206 or profile creation module 222.

In some embodiments, some or all functions of the candidate security awareness assessment server 206 may also be performed by profile creation module 222. For example, in some embodiments, profile creation module 222 may assess the authentication method (one-factor or two-factor authentication or continue to use one-factor) opted by the candidate, same/different password for second password, and strength of the password. In an embodiment, profile creation module 222 may communicate the result of assessment to candidate security awareness assessment server 206 without transmitting the password itself.

In some embodiments, security questions selected by the candidate may provide good insights on the candidate's security awareness. In an embodiment, candidate security awareness assessment server 206 may analyze the one or more security questions selected by the candidate and one or more responses of the candidate to the one or more security questions presented by job application system 204 to determine the candidate's security awareness. For example, candidate security awareness assessment server 206 may evaluate if the candidate selects the security questions whose answers are difficult to guess or easy to guess, if the answers to the security questions are a single word or multiple words, and if the answers are in lower case alphabets or also includes upper case alphabets, numbers and special characters. Further, if the candidate has selected security questions at more than one place in the profile creation process, candidate security awareness assessment server 206 may examine if the candidate selects the same security questions in both places, selects the same answers for the same questions, and the like.

Further, in some embodiments, security assessment questionnaire may provide a direct way of querying the candidate on security awareness. Candidate security awareness assessment server 206 may evaluate the candidate's responses to the security assessment questionnaire to determine the candidate security awareness. In some embodiments, the responses to the security assessment questionnaire may be used as one of the inputs by candidate security awareness assessment server 206 for assessing security awareness. Some of the functionalities of candidate security awareness assessment server 206 as described herein may be performed by profile creation module 222.

In some embodiments, candidate security awareness assessment server 206 may monitor the information obtained for the candidate and analyze the information to determine a level of security awareness of the candidate. Candidate security awareness assessment server 206 may have job vacancies and the level of security awareness required for the job vacancies. Candidate security awareness assessment server 206 may determine if the candidate has enough security awareness required for the vacancy the candidate is applying for.

For example, an IT supervisor may need to have higher security awareness standards than someone in a non-technical role without access to confidential or sensitive information. Further, candidate security awareness assessment server 206 may assess the importance and relevance of security awareness to previous jobs held by the candidate. For example, if the candidate has previously been a waiter, security awareness may not have been an important focus. In other examples, if the candidate has been an IT consultant previously, security awareness may have been important and relevant to the role.

In an example, candidate security awareness assessment server 206 may assess the security awareness of the candidate based on additional searches, background checks etc. In an embodiment, candidate security awareness assessment server 206 may identify whether or not any of the authentication information used by the candidate during the creation of the profile via job application system 204 has been associated with a data breach. As described above, the authentication information may include at least one of strength of password or selection of one-factor or two-factor authentication. In some embodiments, candidate security awareness assessment server 206 may use the authentication information as one of the inputs for calculation of the risk score for the candidate. In some embodiments, candidate security awareness assessment server 206 may determine whether the one or more passwords chosen/selected by the candidate have been associated with a data breach. In an example, candidate security awareness assessment server 206 may determine that a password is associated with a data breach if the password is detected in a password breach database. In some examples, candidate security awareness assessment server 206 may query an external password breach database to determine if the one or more passwords selected by the candidate have been compromised in a data breach. In examples, candidate security awareness assessment server 206 may provide the passwords in a query to the password breach database.

According to an embodiment, candidate security awareness assessment server 206 may further verify if the email address provided by the candidate during the profile creation process and the job application process is involved in a security breach. In an example, candidate security awareness assessment server 206 may compare the email address provided by the candidate with a database of emails involved in major security breaches. In some examples, candidate security awareness assessment server 206 may verify if the email address provided by the candidate is involved in a security breach using websites such as "https://haveibeenpwned.com/" and "https://spycloud.com/".

Further, candidate security awareness assessment server 206 may initiate a credit check and other background checks on the candidate. In some examples, candidate security awareness assessment server 206 may examine the candidate's background including past employment history, criminal records, credit history, civil judgements, social media profiles, photographs, bankruptcies, professional licenses, etc. In an implementation, information about data breaches related to the candidate and background checks may be considered by candidate security awareness assessment server 206 in calculating the risk score of the candidate.

In operation, as a part of assessment of the security awareness of a candidate prior to a decision on whether or not to hire the candidate, simulated phishing campaign manager 234 (or a component therein, such as message generator 236) may be configured to generate one or more simulated phishing communications to be sent out to the candidate. In an embodiment, simulated phishing campaign manager 234 may receive information about the candidate obtained during one of the profile creation process or the job application process of job application system 204. In some embodiments, simulated phishing campaign manager 234 may receive the information about the candidate from job application system 204. Upon receiving the information about the candidate, simulated phishing campaign manager 234 may generate the one or more simulated phishing communications based at least on the information about the candidate. Simulated phishing communications may be used, for example, to determine how the job candidate would respond to an actual phishing attack. In some embodiments, simulated phishing campaign manager 234 may generate the one or more simulated phishing communications at any point during or after the completion of the profile creation process and/or the job application process by the candidate to evaluate specific security vulnerabilities associated with the candidate. Results of the simulated phishing communications obtained from the responses of the candidate may highlight vulnerabilities that would place the hiring organization at risk if the candidate is hired, or if the candidate is permitted to access hiring organization's networks or online services prior to security awareness training that may be provided to the candidate. In an implementation, simulated phishing campaign manager 234 may access simulated phishing messages storage 240 and retrieve a simulated phishing message template for generating the one or more simulated phishing communications.

In some embodiments, simulated phishing campaign manager 234 may generate the one or more simulated phishing communications by personalizing content of the one or more simulated phishing communications based at least on the information provided by the candidate during one of the profile creation process or the job application process of job application system 204 and the information from the hiring organization in relation to the job that the candidate is applying for. In an example, simulated phishing campaign manager 234 may personalize the content of the one or more simulated phishing communications based at least on the information about the candidate that identifies one or more social media platforms of the candidate. For example, simulated phishing campaign manager 234 may determine if the candidate has an account on the one or more social media platforms.

On determining the account of the candidate on the social media platforms, simulated phishing campaign manager 234 may retrieve information about the candidate from the social media platforms and personalize content of the one or more simulated phishing communications based on the information. For instance, simulated phishing campaign manager 234 may identify an interest area, such as sports, of the candidate based on a social media account of the candidate. Based on the identified interest area, simulated phishing campaign manager 234 may personalize content of a simulated phishing communication, such that the simulated phishing communication may include a "Subject:" field, such as "Football Premier League—2020". In an example, the more believable and personalized a simulated phishing communication is, the more likely the candidate's reaction will reflect the candidate's future behavior on receiving an actual phishing message. Therefore, highly personalized simulated phishing communications (simulated phishing attacks) may provide an accurate way of assessing what the candidate does or does not know about phishing attacks. Accordingly, simulated phishing campaign manager 234 may personalize the content of simulated phishing communications before sending out the simulated phishing communications to the candidate.

In an example, simulated phishing campaign manager 234 may retrieve the job profile of the candidate from the job profiles storage 228 of job application system 204. As described above, the job profile of the candidate may include information about the candidate. In an example, the job profile may include information related to name of the candidate, previous employers, candidate's tenure in a specific industry, educational qualifications and/or achievements, professional certifications, demographical details such as age, gender, nationality, etc, and other information from resume of the candidate, and the third-party job application platform used by the candidate to apply for the job vacancy, for example, Monster®, LinkedIn®, Glassdoor™ etc.

In some embodiments, simulated phishing campaign manager 234 may use the information retrieved from the job profile of the candidate to configure the simulated phishing message template, to configure the timing of the simulated phishing communication, or the medium of the simulated phishing communication. Further, in some embodiments, simulated phishing campaign manager 234 may generate the simulated phishing communications based on information determined by the candidate's response to security related questions (for example, questions posed to the candidate in the form of a questionnaire) or based on information determined by the candidate's behavior where the behavior is indicative of a level of security awareness (for example, how the job candidate chooses a password as part of the profile creation process or the job application process). In some examples, simulated phishing campaign manager 234 may use the confirmation email sent to the candidate during the registration of the candidate on job application system 204 as a template for generating the simulated phishing communication. In an example, the simulated phishing communications generated by the message generator 236 may appear to be delivered from a trusted source. For example, if the candidate applied for the job vacancy through Glassdoor™, then message generator 236 may configure the simulated phishing communication to appear as from Glassdoor™. In another example, if the candidate applied for an accounting job on Indeed.com, message generator 236 may configure the simulated phishing communication such that the simulated phishing communication may include a "Subject:" field that is intended to cause the candidate to take an action, such as "accounting position results".

According to an embodiment, simulated phishing campaign manager 234 may communicate the one or more simulated phishing communications to the candidate. In one example, simulated phishing campaign manager 234 may send the one or more simulated phishing communications to the email address of the candidate. On receiving the one or more simulated phishing communications, the candidate may perform an action. In an example, on receiving a simulated phishing communication, the candidate may respond to the simulated phishing communication. In one example, the candidate may open an attachment included in the one or more simulated phishing communications or the candidate may click on a link included in the one or more simulated phishing communications. In another example, on receiving a simulated phishing communication, the candidate may ignore the simulated phishing communication. The action performed by the candidate may be referred to as a candidate response. In an embodiment, the candidate's responses to the simulated phishing communications may be sent to candidate security awareness assessment server 206 for using these responses as an input for calculation of the risk score for the candidate.

Candidate Risk Score Calculation

According to some embodiments, risk score manager 242 of candidate security awareness assessment server 206 may be configured to determine a level of security awareness required for the job position based on job description. In an example, a person authorized (e.g., the person in charge of HR, the person in charge of recruiting, the hiring manager, etc.) in the hiring organization may define the job description. In an example, the job description is used to determine the level of security awareness required for the position. In an example, a job description may be assigned a higher security risk profile. In embodiments, if the candidate is applying for a job with a higher security risk profile, a job weighting factor is used and the total security score for the candidate is multiplied by the job weighting factor. For example, if the job opportunity is for an IT manager, then the job opportunity may be assigned a higher security risk profile as compared to job opportunity for a data entry operator.

In some examples, risk score calculator 244 may monitor the profile creation process and the job application process carried out by the candidate in association with an application for a job in a manner that is undetectable to the candidate. In particular, risk score calculator 244 may be configured to perform certain actions to calculate/derive/determine the risk score for the candidate in association with the application for the job. The risk score of the candidate may be a representation of vulnerability of the candidate to a malicious attack. The risk score may also be referred to as a candidate risk score or a security awareness score. In an example implementation, risk score calculator 244 may calculate the risk score for the candidate based on machine-learned predictive analytics.

In some embodiments, risk score calculator 244 may receive the information about the candidate during one of the profile creation process or the job application process of job application system 204. Subsequently, risk score calculator 244 may calculate the risk score for the candidate based on the information about the candidate. Risk score calculator 244 may also calculate the risk score for the candidate based on the information obtained during candidate profile risk assessment process. In an example, risk score calculator 244 may compare the email address provided by the candidate during the profile creation process with a plurality of email addresses stored in a database that are involved in security breaches. Based on the comparison result, risk score calculator 244 may derive a risk score for the candidate. In another example, risk score calculator 244 may compare the first password (initially set password) and the second password (new or changed password) provided by the candidate during login into job application system 204 to determine a difference factor between the two passwords. Risk score calculator 244 may calculate the risk score for the candidate based on the difference factor. If the difference factor is minimum, risk score calculator may increase the risk score.

In another example, risk score calculator 244 may determine the risk score for the candidate based on the authentication information as one of the inputs. The authentication information may include at least one of the strength of password, the selection of one-factor and/or two-factor authentication. In an example, risk score calculator 244 may determine the risk score for the candidate based on identifying whether or not any of the authentication information has been associated with a data breach. Risk score calculator 244 may also determine the risk score for the candidate based on repetition of similar passwords during password change. According to an embodiment, risk score calculator 244 may receive one or more responses of the candidate to one or more security related questions presented by job application system 204 to the candidate. Risk score calculator 244 may then determine the risk score of the candidate based on the one or more responses of the candidate to the one or more security related questions. Further, risk score calculator 244 may also determine the risk score for the candidate based at least on results of the one or more simulated phishing communications. In an example, risk score calculator 244 may determine the risk score for the candidate based on one or more responses of the candidate to the one or more simulated phishing communications. In some embodiments, risk score calculator 244 may determine separate risk scores using different information and combine the risk scores to determine a combined risk score.

Various factors described above (for example, candidate's responses to the one or more security related questions, information received about the candidate during the profile creation process, candidate's responses to the simulated phishing communications, etc) that may provide an insight into the security awareness of the candidate may be assigned a weight and a score. All the factors may be used, or subset of factors may be used to create the candidate risk score. In some embodiments, the risk score may be calculated using all factors or subset of factors with each factor given equal weight. In another embodiment, the risk score may be calculated by providing different weights to all factors or subset of factors. In another embodiment, the risk score may be calculated as a weighted function of the factors. The factors may be placed on an importance/weight scale, for example, from 1 to 5, 5 being the most important or 1 to 10, 10 being most important. In an implementation, a higher candidate risk score indicates a candidate with a higher security risk and a lower candidate risk score indicates a candidate with a better security awareness. In an embodiment, equal weights may be assigned to different factors. In some embodiments, different weights may be assigned to different factors. According to an embodiment, risk score calculator 244 may determine the risk score as a weighted function of two or more of the following information received via job application system 204: password strength, password reuse, security question selection, phish prone percentage, email exposure and whether or not two-factor authentication is used. Examples of various factors and scores calculation is provided below.

a) Password Strength

In some embodiments, risk score calculator 244 may assign an example weight "5" and rank "0" to the factor 'password strength'. In an embodiment, risk score calculator 244 may assign the rank "0", for example, from 0-4, 0 being strongest. Herein, the password refers to the password chosen by the candidate during the job profile creation process. Further, risk score calculator 244 may assign the rank to the factor 'password strength' based on alignment of the password with the NIST password requirements. In an implementation, risk score calculator 244 may calculate a password strength score based on multiplication of the assigned ranking with the assigned weight of the factor 'password strength'. Additionally, risk score calculator 244 may associate an indication (for example, a flag) with specific password rankings. The indication may prompt the hiring organization to provide security training related to choosing strong passwords to the candidate if the candidate is hired.

b) Password Reuse:

In some embodiments, risk score calculator 244 may assign an example weight "5" to the factor 'password reuse'. Further, in an example, there may be 3 levels which indicate the degree of password reuse. In examples, if the candidate is asked to choose a password 3 times, then there may be three levels for the factor. If the candidate is asked to choose a password n times, then there may be "n" levels for the factor 'password reuse'. Further, if there is no reuse across the n times that the candidate is asked to create a password, then the password reuse level is "0". If the candidate used the same password 2 (where 2<n) times, the password reuse level is "2". In an implementation, risk score calculator 244 may calculate a password reuse score based on multiplication of the password reuse level with assigned weight of the factor 'password reuse'. Additionally, risk score calculator 244 may associate an indication (for example, a flag) with specific password reuse levels. The indication may prompt the hiring organization to provide security training related to choosing unique passwords to the candidate if the candidate is hired.

c) Two-Factor Authentication

In some embodiments, risk score calculator 244 may assign an example weight "3" to the factor 'two-factor authentication'. In an example, if the candidate chooses to enable the two-factor authentication during the profile creation process, then risk score calculator 244 may assign a score (rank) of "0" to the factor 'two-factor authentication'. Further, if the candidate does not choose to enable the two-factor authentication, then risk score calculator 244 may assign a score of "1". In another example, the candidate may have a choice to enable a specific type of two-factor authentication. In such case, risk score calculator 244 may assign a score based on the strength of the two-factor authentication that the candidate decides to enable. In an implementation, risk score calculator 244 may calculate a two-factor authentication score based on multiplication of the weight assigned to the factor 'two-factor authentication' with the score assigned to the factor 'two-factor authentication'. Additionally, risk score calculator 244 may associate an indication (for example, a flag) with specific two-factor authentication scores. The indication may prompt the hiring organization to provide security training related to two-factor authentications to the candidate.

d) Security Question Selection

In some embodiments, risk score calculator 244 may assign an example weight "4" to the factor 'security question selection'. In an example, the candidate is required to select one or more security questions from amongst a plurality of security questions that the candidate will use to recover access to his or her profile. Risk score calculator 244 may assign a complexity rating to each of the selected security questions, where rating of "0" is the most complex and rating of "5" is the weakest. In an example, risk score calculator 244 may calculate the score for the candidate based on sum of the complexity ratings of all the selected security questions. For example, a security question "where were you born?" may be assigned a rating of "5" and a security question "what is your mother's maiden name?" may be assigned a rating of "3". Further, a security question "who is your childhood sports hero?" may be assigned a rating of "0".

In another example, the answers that the candidate provides to security questions may be used to determine the candidate's score. For example, for each security question, risk score calculator 244 may assign a score to the candidate based on the number of characters in the answer provided by the candidate, the number of distinct words in the answer provided by the candidate, the number of non-letter characters (for example, count of numerals, count of special characters) in the answer provided by the candidate. Further, in examples, risk score calculator 244 may assign a score to the candidate that may reflect how often the case (upper case, lower case) of the answer changes. In an implementation, risk score calculator 244 may calculate a total security score based on totaling the total scores for a given security question answer. In an example, sum of the totaled scores may be indicative of security questions score. As may be understood, the candidate responses reflective of the highest security awareness may be assigned lower scores. Further, risk score calculator 244 may calculate the final security questions risk score based on multiplication of the total security questions score with the weight assigned to the factor 'security question selection'. Additionally, risk score calculator 244 may associate an indication (for example, a flag) with specific security questions scores. Candidate security awareness assessment server 206 may use indication to prompt the hiring organization to provide security training to the candidate related to selecting and answering security questions.

e) Phish Prone Percentage

In some embodiments, risk score calculator 244 may assign an example weight "5" to the factor 'phish prone percentage'. The phish prone percentage is calculated based upon the number of failure points a candidate responds to in a simulated phishing communication. The failure points include the following actions:
  (i) Clicking the embedded link
  (ii) Entering data on a landing page
  (iii) Opening an attachment
  (iv) Enabling a macro on an attachment
  (v) Replying to the simulated phishing email In an example, risk score calculator 244 may assign a score to the candidate based on the response of the candidate to a simulated phishing communication/attack (for example, phishing, vishing, smishing, etc.). In an example, if the candidate does not respond to or report the simulated phishing communication, then risk score calculator 244 may assign a score of "0" to the candidate. In another example, if the candidate responds to the simulated phishing communication, for example, by clicking or providing information, risk score calculator 244 may assign a score of "100%" to the candidate. The score of 100% may be normalized to 1 by the risk score calculator 244. If more than one simulated phishing communication is provided to the candidate, risk score calculator 244 may average the scores across all the simulated phishing communications. Further, risk score calculator 244 may calculate the total phish prone percentage score by multiplication of the average score with the weight assigned to the factor 'phish prone percentage'. Additionally, risk score calculator 244 may associate an indication (for example, a flag) with the specific simulated phishing communications that the candidate failed. The indication may prompt the hiring organization to provide security training to the candidate related to related to the exploits of the failed simulated phishing communications.

f) Email Exposure

In some embodiments, risk score calculator 244 may assign an example weight "1" to the factor 'email exposure'. In one embodiment, the weight provided may be less due to possibility that the email exposure of the candidate was not due to candidate's lack of awareness but due to a security breach at a service provider. In an example, risk score calculator 244 may determine if any of the email addresses provided by the candidate has been associated with a security breach. Further, risk score calculator 244 may assign a score of "1" if it is determined that a particular email address is associated with a security breach, and a score of "0" if it is determined that the particular email address is not associated with a security breach. Risk score calculator 244 may calculate a final email exposure score based on summing the scores of all email addresses provided by the candidate and multiplying the summed score with weight assigned to the factor 'email exposure'.

g) Security Assessment

In some embodiments, risk score calculator 244 may assign an example weight "5" to the factor 'security assessment'. In some examples, each of the security related questions in the security assessment questionnaire is assigned its own weight. For example, the security related questions may be grouped by knowledge areas (domains): email security, incident reporting, internet use, mobile devices, passwords & authentication, security awareness, and social media use. These knowledge areas may be associated with categories of content for security awareness training. In some examples, there is one weight assigned for the totality of the security assessment. Further, in some examples, there is one weight for all the security related questions in each knowledge area. In an implementation, risk score calculator 244 may calculate a score based on the candidate's performance in each knowledge area. In an example, risk score calculator 244 may calculate a total security assessment score-based multiplication of the total score (in percentage) with the weight assigned to the factor 'security assessment'. In some examples, these knowledge areas are associated with the categories of content for security awareness training. Additionally, risk score calculator 244 may associate an indication (for example, a flag) with the scores for each of the security related questions or for each knowledge area group of security related questions. The indication may prompt the hiring organization to provide security training to the candidate related to specific knowledge areas.

Other ways to determine a candidate's risk score are possible and whilst not explicitly discussed, are contemplated herein. In an implementation, risk score calculator 244 may store risk scores of the candidates in candidate risk scores storage 246. Candidate risk scores storage 246 may store risk scores of all candidates who have applied for the job at the hiring organization. According to some embodiments, risk score calculator 244 may provide the risk score of the candidate to job application system 204 for use by job application system 204 to provide information on whether or not the candidate is to be hired. In an implementation, recruitment decision module 226 of job application system 204 may be configured to compare the risk score with a pre-determined threshold score to determine whether the candidate can be hired or not. Based on the comparison result, recruitment decision module 226 may provide a recommendation on recruitment of the candidate to the hiring organization. For example, the recruitment decision module 226 may provide a recommendation to not progress the candidate to the interview stage if the candidate risk score is higher than the threshold score. In some embodiments, multiple candidates may have passed the threshold. In such situations, risk scores of the candidates may be compared to identify the best candidates. In an example, recruitment decision module 226 may use the risk score of the candidate in conjunction with information obtained from other sources (for example scores from job candidate's interviews, Intelligence Quotient (IQ) tests, psychometric testing, etc.) to make the recommendation as to whether or not to hire the candidate. Further, if recruitment decision module 226 provides a recommendation to hire the candidate, recruitment decision module 226 may also provide recommendations on what security awareness training the candidate is likely to benefit from and the relative urgency and priority of that training.

In some embodiments, recruitment decision module 226 may be configured to compare risk scores of the candidates whose risk scores are found to be below the pre-determined threshold scores. Further, based on the comparison, recruitment decision module 226 may be configured to provide recommendation of one or more of these candidates based for further process in hiring. In an example, recruitment decision module 226 may provide recommendation of the candidate who has the lowest risk score.

According to an embodiment, recruitment decision module 226 may also determine strengths and vulnerabilities/weaknesses of the candidate based on the risk score of the candidate. The hiring organization may use the result of determination, for example, as an input into the hiring decision, as an input into the onboarding process, as an input into the type of position that the candidate would be best suited or unsuitable for, to decide whether to offer the candidate a position with the organization, and to determine what training the candidate needs to undergo once hired and before they have access to the hiring organization's Information Technology (IT) systems. In an example, the hiring organization may determine the level of access a candidate has to the hiring organization's Information Technology (IT) systems when hired. In an example, the hiring organization may determine whether to progress with the candidate to the next stage of hiring based on the recommendation provided by recruitment decision module 226.

According to an implementation, the hiring organization may send an instruction to candidate security awareness assessment server 206 to assess a candidate on a request instead of performing the assessment at recruitment decision module 226. Such configuration may be implemented across an Application Programming Interface (API) surface or via API calls between platforms or with a job candidate workflow driven by recruitment decision module 226. The implementation may be performed through a talent management platform or an Applicant Tracking System (ATS).

Figure 3:
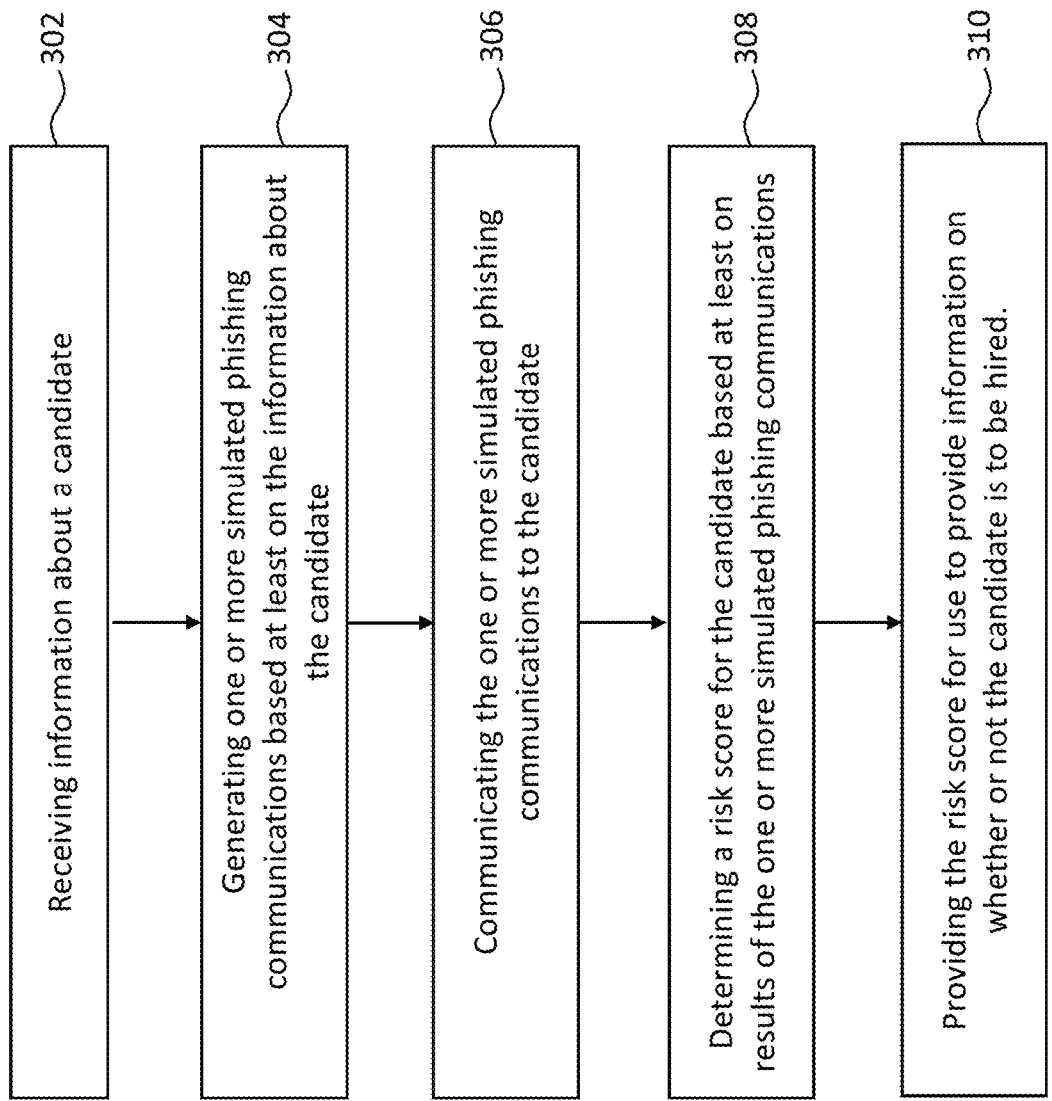
FIG. 3 depicts a flow chart for determining a risk score of a candidate based on a response to one or more simulated phishing communications, according to some embodiments.

Referring to FIG. 3, FIG. 3 depicts an implementation of a method 300 for determining a risk score of a candidate based on a response to one or more simulated phishing communications, according to some embodiments.

The order in which the method is described is not intended to be construed as a limitation, and any number of the described method blocks can be combined in any order to implement the method, or an another implementation of the method.

Step 302 includes receiving information about a candidate. In an implementation, candidate security awareness assessment server 206 (or a component therein, such as simulated phishing campaign manager 234) may receive information about the candidate from job application system 204 during one of a profile creation process or a job application process of job application system 204. The information may include personal details and professional details of the candidate. The information may also include information gathered about the candidate through background checks and/or dark web scans. In some implementations, candidate security awareness assessment server 206 may also obtain information about the candidate from one or more social media platforms of the candidate.

Step 304 includes generating one or more simulated phishing communications based at least on the information about the candidate. In an implementation, candidate security awareness assessment server 206 (or a component therein, such as message generator 236) may generate one or more simulated phishing communications based at least on the information about the candidate obtained from job application system 204. In some embodiments, job application system 204 may personalize content of the one or more simulated phishing communications based at least on the information about the candidate that identifies one or more social media platforms of the candidate.

Step 306 includes communicating the one or more simulated phishing communications to the candidate. According to an embodiment, candidate security awareness assessment server 206 (or a component therein, such as message generator 236) may communicate the one or more simulated phishing communications generated based at least on the information about the candidate to the candidate. In one example, candidate security awareness assessment server 206 may communicate the one or more simulated phishing communications to the email address of the candidate.

Step 308 includes determining a risk score for the candidate based at least on results of the one or more simulated phishing communications. The risk score of the candidate may be a representation of vulnerability of the candidate to a malicious attack. According to an embodiment, candidate security awareness assessment server 206 (or a component therein, such as risk score calculator 244) may determine a risk score for the candidate based at least on results of the one or more simulated phishing communications. In an example, candidate security awareness assessment server 206 may analyze the responses provided by the candidate in response to the one or more simulated phishing communications and determine the risk score for the candidate.

Step 310 includes providing the risk score to provide information on whether or not the candidate is to be hired. According to an embodiment, candidate security awareness assessment server 206 (or a component therein, such as risk score calculator 244) may provide the risk score to job application system 204 for use by job application system 204 to provide information on whether or not the candidate is to be hired. In an embodiment, job application system 204 may be configured to compare the risk score with a pre-determined threshold score to determine whether the candidate can be hired or not.

Figure 4:
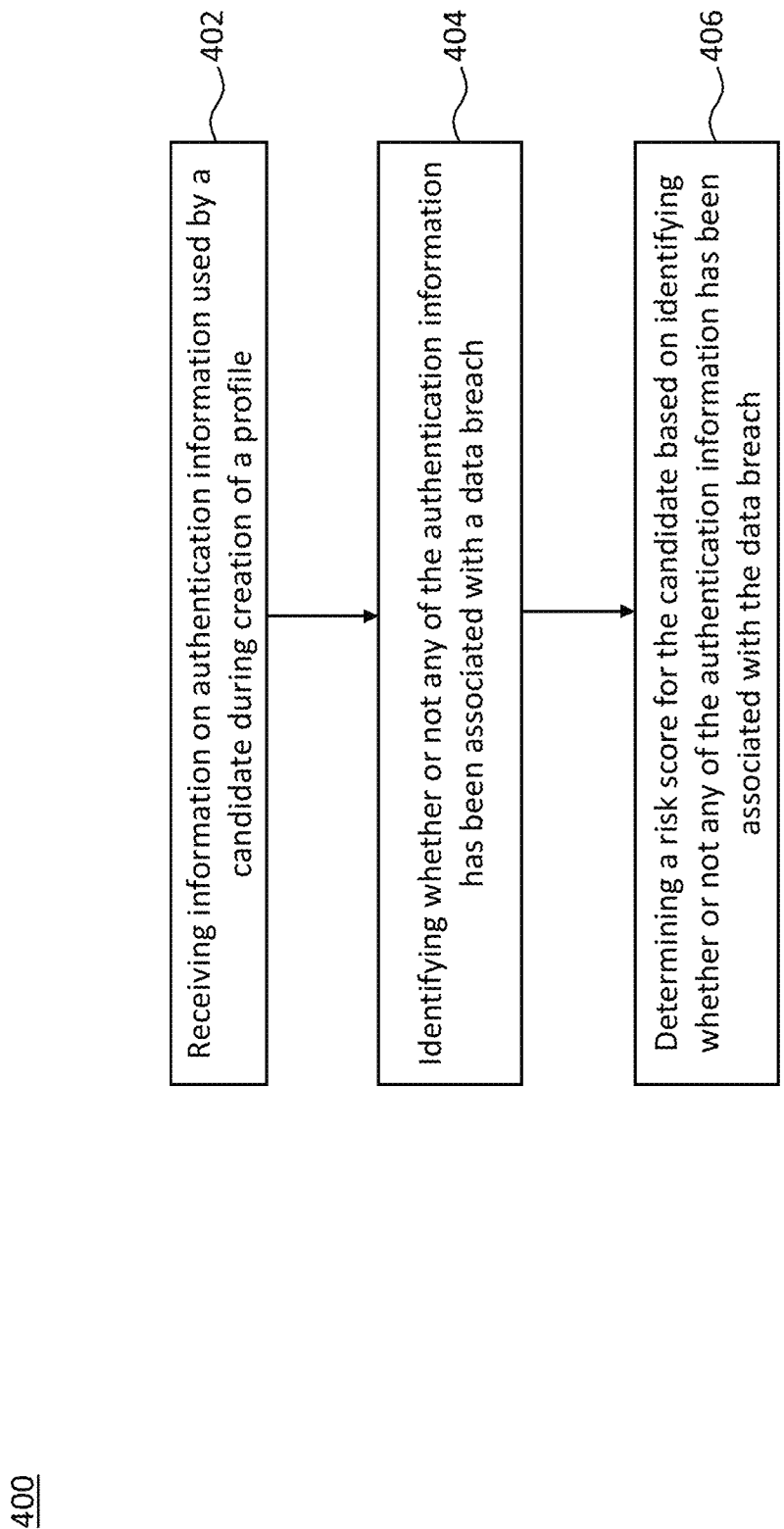
FIG. 4 depicts a flow chart for determining a risk score of a candidate based on authentication information, according to some embodiments.

FIG. 4 depicts an implementation of a method 400 for determining a risk score of a candidate based on authentication information, according to some embodiments.

The order in which the method is described is not intended to be construed as a limitation, and any number of the described method blocks can be combined in any order to implement the method, or an another implementation of the method.

Step 402 includes receiving information on authentication information used by a candidate during creation of a profile. In an example, the authentication information may include at least one of strength of password or selection of one-factor or two-factor authentication. According to an implementation, candidate security awareness assessment server 206 may receive information on the authentication information used by the candidate during creation of a profile by job application system 204.

Step 404 includes identifying whether or not any of the authentication information has been associated with a data breach. According to an implementation, candidate security awareness assessment server 206 may identifying whether or not any of the authentication information has been associated with the data breach. In some embodiments, candidate security awareness assessment server 206 may determine whether the one or more passwords chosen/selected by the candidate have been associated with a data breach. In an example, candidate security awareness assessment server 206 may determine that a password is associated with a data breach if the password is detected in a password breach database. In some examples, candidate security awareness assessment server 206 may query an external password breach database to determine if the one or more passwords selected by the candidate have been compromised in a data breach. In examples, candidate security awareness assessment server 206 may provide the passwords in a query to the password breach database.

Step 406 includes determining a risk score for the candidate based on identifying whether or not any of the authentication information has been associated with the data breach. According to an embodiment, candidate security awareness assessment server 206 (or a component therein, such as risk score calculator 244) may determine a risk score for the candidate based on identifying whether or not any of the authentication information has been associated with the data breach.

Figure 5:
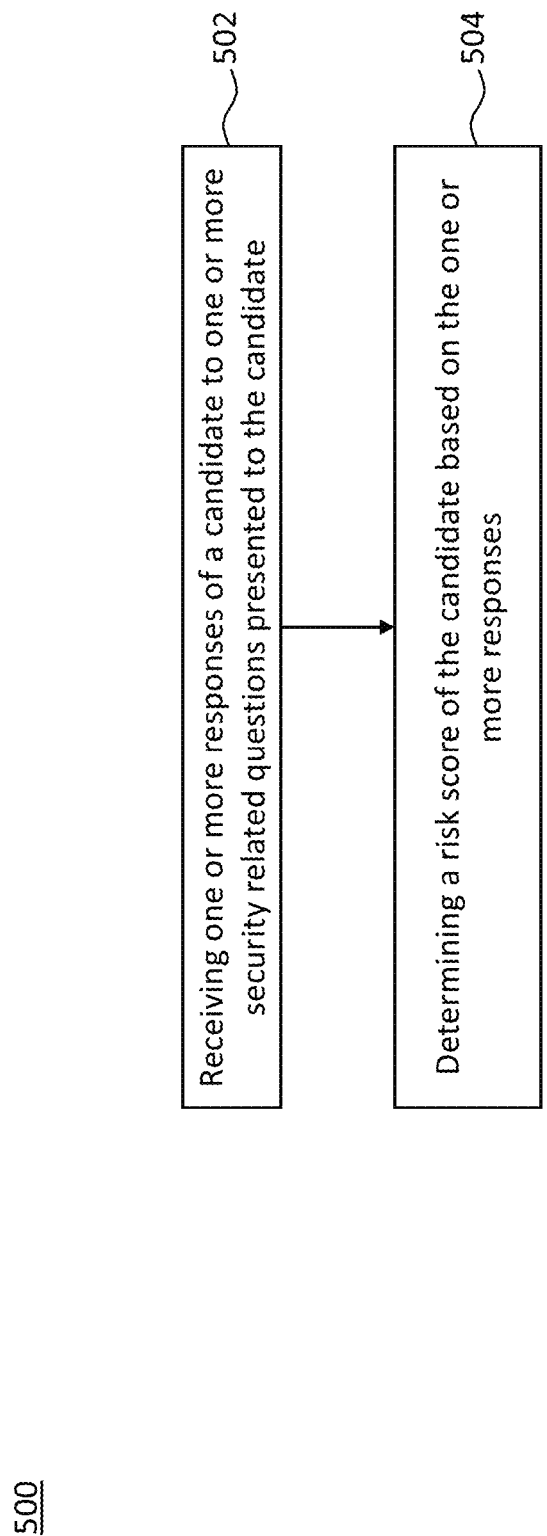
FIG. 5 depicts a flow chart for determining a risk score of a candidate based on a response to one or more security related questions, according to some embodiments.

FIG. 5 depicts an implementation of a method 500 for determining a risk score of a candidate based on a response to one or more security related questions, according to some embodiments.

The order in which the method is described is not intended to be construed as a limitation, and any number of the described method blocks can be combined in any order to implement the method, or an another implementation of the method.

Step 502 includes receiving one or more responses of a candidate to one or more security related questions presented to the candidate. According to an embodiment, candidate security awareness assessment server 206 (or a component therein, such as risk score calculator 244) may receive one or more responses of the candidate to one or more security related questions presented to the candidate by job application system 204. Examples of security related questions include "What makes a password a strong password?", "Should you worry about viruses or malicious attachments since your company has fantastic anti-virus software", "Should you always open an email attachment received in an email from your CEO?", etc.

Step 504 includes determining a risk score of the candidate based on the one or more responses. According to an embodiment, candidate security awareness assessment server 206 (or a component therein, such as risk score calculator 244) may be configured to determine a risk score of the candidate based on the one or more responses.

Figure 6:
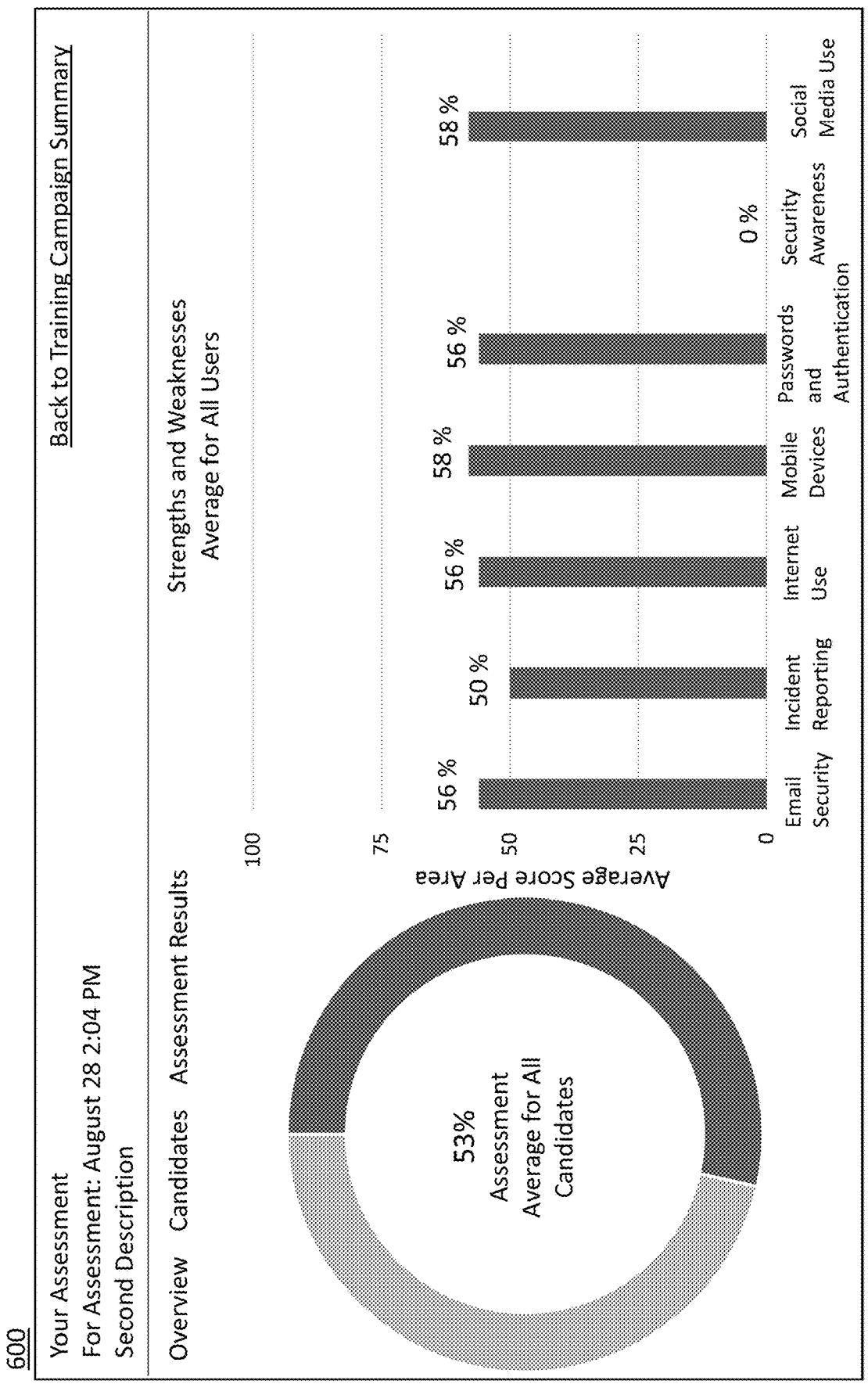
FIG. 6 depicts an example of a visual indication of security awareness assessment of candidates for a job vacancy, according to some embodiments.

Referring to FIG. 6, FIG. 6 depicts an example 600 of a visual indication of security awareness assessment of candidates for a job vacancy, according to some embodiments.

According to an embodiment, job application system 204 may assess the security awareness of a candidate based on information obtained from the candidate during the profile creation process and/or the job application process. Job application system 204 may be configured to generate a visual indication of the strengths and weaknesses/vulnerabilities of the candidate based on the security awareness assessment of the candidate. In some examples, job application system 204 may display the security awareness assessment of the candidate in a visual dashboard for the hiring organization. Where multiple candidates have applied for the job vacancy, job application system 204 may collectively display the security awareness assessments of all the candidates on a single visual dashboard for the job vacancy in the hiring organization. In some embodiments, job application system 204 may collectively display the security awareness assessments of one or more candidates on a single visual dashboard for one or more job vacancies in the hiring organization.

As can be seen in FIG. 6, an example 600 of visual indication of security awareness assessment of candidates for a job vacancy is illustrated. Average score per knowledge area of all the candidates are shown. As can be seen in the visual indication, 56 percent is the average score of the candidates with respect to knowledge area 'Email Security' and 50 percent is the average score of the candidates with respect to knowledge area 'Incident reporting'. For the knowledge area 'Internet Use', average score of the candidates is 56 percent, for the knowledge area 'Mobile Devices' average score of the candidates is 58 percent, for the knowledge area 'Passwords & Authentication' average score of the candidates is 56 percent, for the knowledge area 'Security Awareness' average score of the candidates is 0 percent, and for the knowledge area 'Social Media' average score of the candidates is 58 percent. Further, assessment average score for all the candidates is 53 percent. Example 600 may illustrate a user-end view for a hiring manager, a HR representative and/or a security trainer.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of using one or more simulated phishing communications to provide a risk score for a candidate in association with an application for a job, the method comprising:

receiving, by a server configured to communicate one or more simulated phishing communications and configured to communicate with a job application system executed on one or more servers, via one or more application programming interfaces (APIs) between the server and the job application system, information about a candidate from a job application process of the job application system responsive to the job application process and authentication information used by the candidate during creation of a profile via the job application system;

generating, by the server responsive to receiving the information, one or more simulated phishing communications to include content personalized by the server based at least on the information about the candidate received from the job application process;

communicating, by the server responsive to receiving the information, the one or more simulated phishing communications to one or more devices of the candidate;

receiving, by the server, one or more responses to the one or more simulated phishing communications from the one or more devices of the candidate;

determining, by the server responsive to the one more responses, a risk score for the candidate based at least on the authentication information received from the job application system and the one or more responses to the one or more simulated phishing communications received from the one or more devices of the candidate; and providing, by the server via the one or more APIs, the risk score to the job application system for use by the job application system to provide information on whether or not the candidate is to be hired.

2. The method of claim 1, further comprising receiving the information about the candidate during one of a profile creation process or a job application process of the job application system.

3. The method of claim 1, further comprising generating, by the server, the one or more simulated phishing communications by personalizing content of the one or more simulated phishing communications based at least on the information about the candidate that identifies one or more social media platforms of the candidate.

4. The method of claim 1, wherein the authentication information includes at least one of strength of password or selection of one-factor or two-factor authentication.

5. The method of claim 1, further comprising identifying, by the server for use in determining the risk score, whether or not any of the authentication information has been associated with a data breach.

6. The method of claim 1, further comprising receiving, by the server, one or more responses of the candidate to one or more security related questions presented by the job application system to the candidate.

7. The method of claim 6, further comprising determining, by the server, the risk score of the candidate based on the one or more responses.

8. The method of claim 1, further comprising determining, by the server, the risk score as a weighted function of two or more of the following information received via the job application system: password strength, password reuse, security question selection, phish prone percentage, email exposure and whether or not two-factor authentication is used.

9. A system of using one or more simulated phishing communications to provide a risk score for a candidate in association with an application for a job, the system comprising:
a server comprising one or more processors, coupled to memory and configured to communicate one or more simulated phishing communications and configured to communicate with a job application system executed on one or more servers and to:
receive, via one or more application programming interfaces (APIs) between the server and the job application system, information about a candidate from a job application process of a job application system responsive to the job application process and authentication information used by the candidate during creation of a profile via the job application system;
generate, responsive to receiving the information, one or more simulated phishing communications to include content personalized by the server based at least on the information about the candidate received from the job application process;
communicate, responsive to receiving the information, the one or more simulated phishing communications to one or more devices of the candidate;
receive one or more responses to the one or more simulated phishing communications from the one or more devices of the candidate;
determine, responsive to the one more responses, a risk score for the candidate based at least on the authentication information received from the job application system and the one or more responses to the one or more simulated phishing communications received from the one or more devices of the candidate; and
provide, via the one or more APIs, the risk score to the job application system for use by the job application system to provide information on whether or not the candidate is to be hired.

10. The system of claim 9, wherein the server is further configured to receive the information about the candidate during one of a profile creation process or a job application process of the job application system.

11. The system of claim 9, wherein the server is further configured to generate the one or more simulated phishing communications by personalizing content of the one or more simulated phishing communications based at least on the information about the candidate that identifies one or more social media platforms of the candidate.

12. The system of claim 9, wherein the authentication information includes at least one of strength of password or selection of one-factor or two-factor authentication.

13. The system of claim 9, wherein the server is further configured to identify for use in determining the risk score, whether or not any of the authentication information has been associated with a data breach.

14. The system of claim 9, wherein the server is further configured to receive one or more responses of the candidate to one or more security related questions presented by the job application system to the candidate.

15. The system of claim 14, wherein the server is further configured to determine the risk score of the candidate based on the one or more responses.

16. The system of claim 9, wherein the server is further configured to determine the risk score as a weighted function of two or more of the following information received via the job application system: password strength, password reuse, security question selection, phish prone percentage, email exposure and whether or not two-factor authentication is used.

* * * * *